United States Patent
Ghods et al.

(10) Patent No.: US 9,519,526 B2
(45) Date of Patent: ***Dec. 13, 2016

(54) FILE MANAGEMENT SYSTEM AND COLLABORATION SERVICE AND INTEGRATION CAPABILITIES WITH THIRD PARTY APPLICATIONS

(71) Applicant: Box, Inc., Redwood City, CA (US)

(72) Inventors: Sam Ghods, San Francisco, CA (US); Florian Jourda, San Francisco, CA (US); Aaron Levie, Palo Alto, CA (US)

(73) Assignee: Box, Inc., Redwood City, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 13/646,339

(22) Filed: Oct. 5, 2012

(65) Prior Publication Data

US 2013/0031147 A1 Jan. 31, 2013

Related U.S. Application Data

(63) Continuation of application No. 12/260,533, filed on Oct. 29, 2008, now Pat. No. 8,326,814.

(Continued)

(51) Int. Cl.
*G06F 17/30* (2006.01)
*G06F 9/54* (2006.01)

(52) U.S. Cl.
CPC .................................... *G06F 9/541* (2013.01)

(58) Field of Classification Search
USPC .............. 707/2, 3, 104.1; 709/227; 711/100
See application file for complete search history.

(56) References Cited

U.S. PATENT DOCUMENTS

| | | | |
|---|---|---|---|
| 5,787,175 | A | 7/1998 | Carter |
| 5,799,320 | A | 8/1998 | Klug |
| 5,848,415 | A | 12/1998 | Guck |
| 5,864,870 | A | 1/1999 | Guck |
| 5,999,908 | A | 12/1999 | Abelow |
| 6,016,467 | A * | 1/2000 | Newsted et al. .................. 704/9 |
| 6,034,621 | A | 3/2000 | Kaufman |
| 6,055,543 | A | 4/2000 | Christensen et al. |
| 6,073,161 | A | 6/2000 | DeBoskey et al. |
| 6,098,078 | A | 8/2000 | Gehani et al. |

(Continued)

FOREIGN PATENT DOCUMENTS

| | | |
|---|---|---|
| CA | 2724521 | 11/2009 |
| CN | 101997924 A | 3/2011 |

(Continued)

OTHER PUBLICATIONS

"PaperPort Professional 14," PC Mag. Com review, published Feb. 2012, Ziff Davis, Inc., 8 pages.

(Continued)

*Primary Examiner* — Etienne Leroux
(74) *Attorney, Agent, or Firm* — Perkins Coie LLP

(57) ABSTRACT

A system and method for providing a file management service for collaboration is disclosed. The method for providing a file management service for collaboration, which may be implemented on a system, includes, for example, providing a client through which a user accesses a file through the file management service, further providing, by the file management service via the client, the user with collaboration capability of the file with other users, and/or controlling editing of the file by other users based on whether it is specified as being shared by the user. In one embodiment, the file management service further enables integration of a third-party service with the file management service and the third-party service is accessible for use with the file via the file management service.

18 Claims, 11 Drawing Sheets

Related U.S. Application Data

(60) Provisional application No. 60/992,656, filed on Dec. 5, 2007, provisional application No. 61/055,901, filed on May 23, 2008.

(56) References Cited

U.S. PATENT DOCUMENTS

| | | |
|---|---|---|
| 6,233,600 B1 | 5/2001 | Salas et al. |
| 6,260,040 B1 * | 7/2001 | Kauffman ......... G06F 17/30067 |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,515,681 B1 | 2/2003 | Knight |
| 6,539,381 B1 | 3/2003 | Prasad et al. |
| 6,584,466 B1 * | 6/2003 | Serbinis et al. ............... 715/209 |
| 6,636,872 B1 | 10/2003 | Heath et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,130,831 B2 | 10/2006 | Howard et al. |
| 7,133,834 B1 | 11/2006 | Abelow |
| 7,149,787 B1 | 12/2006 | Mutalik et al. |
| 7,155,483 B1 | 12/2006 | Friend et al. |
| 7,165,107 B2 | 1/2007 | Pouyoul et al. |
| 7,222,078 B2 | 5/2007 | Abelow |
| 7,275,244 B1 | 9/2007 | Bell et al. |
| 7,296,025 B2 | 11/2007 | Kung et al. |
| 7,346,778 B1 | 3/2008 | Guiter et al. |
| 7,353,252 B1 | 4/2008 | Yang et al. |
| 7,370,269 B1 | 5/2008 | Prabhu et al. |
| 7,386,535 B1 | 6/2008 | Kalucha et al. |
| 7,401,117 B2 | 7/2008 | Dan et al. |
| 7,523,486 B1 * | 4/2009 | Turner ................. G06F 21/604 |
| | | 707/999.009 |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,890,964 B2 | 2/2011 | Vogler-Ivashchanka et al. |
| 7,937,663 B2 | 5/2011 | Parker et al. |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,117,261 B2 | 2/2012 | Briere et al. |
| 8,140,513 B2 | 3/2012 | Ghods et al. |
| 8,151,183 B2 | 4/2012 | Chen et al. |
| 8,179,445 B2 | 5/2012 | Hao |
| 8,214,747 B1 | 7/2012 | Yankovich et al. |
| 8,230,348 B2 | 7/2012 | Peters et al. |
| 8,326,814 B2 | 12/2012 | Ghods et al. |
| 8,347,276 B2 | 1/2013 | Schadow |
| 8,358,701 B2 | 1/2013 | Chou et al. |
| 8,370,803 B1 | 2/2013 | Holler et al. |
| 8,429,540 B1 | 4/2013 | Yankovich et al. |
| 8,464,161 B2 | 6/2013 | Giles et al. |
| 8,515,902 B2 | 8/2013 | Savage |
| 8,527,549 B2 | 9/2013 | Cidon |
| 8,549,066 B1 | 10/2013 | Donahue et al. |
| 8,549,511 B2 | 10/2013 | Seki et al. |
| 8,583,619 B2 | 11/2013 | Ghods et al. |
| 8,607,306 B1 | 12/2013 | Bridge et al. |
| 8,719,445 B2 | 5/2014 | Ko |
| 8,745,267 B2 | 6/2014 | Luecke et al. |
| 8,849,955 B2 | 9/2014 | Prahlad et al. |
| 8,868,574 B2 | 10/2014 | Kiang et al. |
| 8,892,679 B1 | 11/2014 | Destagnol et al. |
| 8,914,900 B2 | 12/2014 | Smith et al. |
| 2001/0027492 A1 | 10/2001 | Gupta |
| 2002/0029218 A1 | 3/2002 | Bentley et al. |
| 2002/0091738 A1 | 7/2002 | Rohrabaugh et al. |
| 2002/0099772 A1 | 7/2002 | Deshpande et al. |
| 2002/0116544 A1 * | 8/2002 | Barnard et al. ............... 709/324 |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0115326 A1 * | 6/2003 | Verma et al. ................ 709/225 |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2004/0021686 A1 | 2/2004 | Barberis |
| 2004/0088647 A1 | 5/2004 | Miller et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0177138 A1 | 9/2004 | Salle et al. |
| 2004/0181579 A1 | 9/2004 | Huck et al. |
| 2004/0196307 A1 | 10/2004 | Zak et al. |
| 2004/0201604 A1 | 10/2004 | Kraenzel et al. |
| 2004/0230624 A1 | 11/2004 | Frolund et al. |
| 2004/0246532 A1 * | 12/2004 | Inada ........................... 358/402 |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0028006 A1 | 2/2005 | Leser et al. |
| 2005/0033602 A1 * | 2/2005 | Cirinna et al. ................... 705/1 |
| 2005/0050228 A1 | 3/2005 | Perham et al. |
| 2005/0063083 A1 | 3/2005 | Dart et al. |
| 2005/0097225 A1 | 5/2005 | Glatt et al. |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0138118 A1 | 6/2005 | Banatwala et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0246637 A1 * | 11/2005 | Knight .................. G06N 5/025 |
| | | 715/700 |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |

(56) References Cited

U.S. PATENT DOCUMENTS

| | | |
|---|---|---|
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0117247 A1 | 6/2006 | Fite et al. |
| 2006/0123062 A1 | 6/2006 | Bobbitt et al. |
| 2006/0133340 A1 | 6/2006 | Rybak et al. |
| 2006/0168550 A1 | 7/2006 | Muller et al. |
| 2006/0174051 A1 | 8/2006 | Lordi et al. |
| 2006/0174054 A1* | 8/2006 | Matsuki ............. 711/100 |
| 2006/0179070 A1 | 8/2006 | George et al. |
| 2006/0242204 A1 | 10/2006 | Karas et al. |
| 2006/0259524 A1 | 11/2006 | Horton |
| 2006/0265719 A1 | 11/2006 | Astl et al. |
| 2006/0271510 A1 | 11/2006 | Harward et al. |
| 2007/0016680 A1* | 1/2007 | Burd et al. ............ 709/227 |
| 2007/0038934 A1 | 2/2007 | Fellman |
| 2007/0079242 A1 | 4/2007 | Jolley et al. |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1* | 6/2007 | Zhang ............ G06F 17/30893 |
| 2007/0130163 A1 | 6/2007 | Perez et al. |
| 2007/0198609 A1 | 8/2007 | Black et al. |
| 2007/0208878 A1 | 9/2007 | Barnes-Leon et al. |
| 2007/0214180 A1* | 9/2007 | Crawford ............. 707/104.1 |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0040503 A1 | 2/2008 | Kleks et al. |
| 2008/0046828 A1 | 2/2008 | Bibliowicz et al. |
| 2008/0059656 A1 | 3/2008 | Saliba et al. |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0091763 A1 | 4/2008 | Devonshire et al. |
| 2008/0091790 A1* | 4/2008 | Beck ............. 709/217 |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0215883 A1 | 9/2008 | Fok et al. |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2008/0294899 A1 | 11/2008 | Gazzetta et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0044128 A1 | 2/2009 | Baumgarten et al. |
| 2009/0049131 A1 | 2/2009 | Lyle et al. |
| 2009/0119322 A1 | 5/2009 | Mills et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0265430 A1 | 10/2009 | Bechtel et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0162365 A1 | 6/2010 | Del Real |
| 2010/0162374 A1 | 6/2010 | Nair |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0218237 A1 | 8/2010 | Ferris et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |

(56) References Cited

U.S. PATENT DOCUMENTS

| | | |
|---|---|---|
| 2010/0332401 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0093567 A1 | 4/2011 | Jeon et al. |
| 2011/0099006 A1 | 4/2011 | Sundararaman et al. |
| 2011/0107205 A1 | 5/2011 | Chow et al. |
| 2011/0113320 A1 | 5/2011 | Neff et al. |
| 2011/0119313 A1 | 5/2011 | Sung et al. |
| 2011/0137991 A1 | 6/2011 | Russell |
| 2011/0142410 A1 | 6/2011 | Ishii |
| 2011/0145744 A1 | 6/2011 | Haynes et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0209064 A1 | 8/2011 | Jorgensen et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252071 A1 | 10/2011 | Cidon |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0289433 A1 | 11/2011 | Whalin et al. |
| 2011/0313803 A1 | 12/2011 | Friend et al. |
| 2011/0320197 A1 | 12/2011 | Conejero et al. |
| 2012/0036370 A1 | 2/2012 | Lim et al. |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089659 A1 | 4/2012 | Halevi et al. |
| 2012/0092055 A1 | 4/2012 | Peschke et al. |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0144283 A1 | 6/2012 | Hill et al. |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0173625 A1 | 7/2012 | Berger |
| 2012/0179981 A1 | 7/2012 | Whalin et al. |
| 2012/0185355 A1 | 7/2012 | Kilroy |
| 2012/0192055 A1 | 7/2012 | Antebi et al. |
| 2012/0192086 A1 | 7/2012 | Ghods et al. |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0257249 A1 | 10/2012 | Natarajan |
| 2012/0263166 A1 | 10/2012 | Cho et al. |
| 2012/0266203 A1 | 10/2012 | Elhadad et al. |
| 2012/0284638 A1 | 11/2012 | Cutler et al. |
| 2012/0284664 A1 | 11/2012 | Zhao |
| 2012/0296790 A1 | 11/2012 | Robb |
| 2012/0309540 A1 | 12/2012 | Holme et al. |
| 2012/0311157 A1 | 12/2012 | Erickson et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0080919 A1 | 3/2013 | Kiang et al. |
| 2013/0117337 A1 | 5/2013 | Dunham |
| 2013/0117376 A1 | 5/2013 | Filman et al. |
| 2013/0124638 A1 | 5/2013 | Barreto et al. |
| 2013/0138608 A1 | 5/2013 | Smith |
| 2013/0138615 A1 | 5/2013 | Gupta et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0185347 A1 | 7/2013 | Romano |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212486 A1 | 8/2013 | Joshi et al. |
| 2013/0218978 A1 | 8/2013 | Weinstein et al. |
| 2013/0239049 A1 | 9/2013 | Perrodin et al. |
| 2013/0246932 A1 | 9/2013 | Zaveri et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0282830 A1 | 10/2013 | Besen et al. |
| 2013/0305039 A1 | 11/2013 | Gauda |
| 2013/0326344 A1 | 12/2013 | Masselle et al. |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0032489 A1 | 1/2014 | Hebbar et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0052939 A1 | 2/2014 | Tseng et al. |
| 2014/0068589 A1 | 3/2014 | Barak |
| 2014/0150023 A1 | 5/2014 | Gudorf et al. |
| 2014/0156373 A1 | 6/2014 | Roberts et al. |
| 2014/0172595 A1 | 6/2014 | Beddow et al. |

FOREIGN PATENT DOCUMENTS

| | | |
|---|---|---|
| CN | 102264063 A | 11/2011 |
| EP | 0348614 A2 | 1/1990 |
| EP | 0921661 A2 | 6/1999 |
| EP | 1349088 | 10/2003 |
| EP | 1528746 A2 | 5/2005 |

(56) References Cited

FOREIGN PATENT DOCUMENTS

| | | |
|---|---|---|
| EP | 1933242 A1 | 6/2008 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 A | 10/2008 |
| KR | 20020017444 A | 3/2002 |
| KR | 20040028036 A | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-0219128 A1 | 3/2002 |
| WO | WO-2004097681 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |
| WO | WO-2013166520 | 11/2013 |

OTHER PUBLICATIONS

"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
Exam Report for GB1309209.3, Applicant: Box, Inc. Mailed Oct. 30, 2013, 11 pages.
Exam Report for GB1310666.1, Applicant: Box, Inc. Mailed Aug. 30, 2013, 10 pages.
Exam Report for GB1313559.5, Applicant: Box, Inc., Mailed Aug. 22, 2013, 19 pages.
Exam Report for GB1316532.9, Applicant: Box, Inc. Mailed Oct. 31, 2013, 10 pages.
Exam Report for GB1316533.7, Applicant: Box, Inc. Mailed Oct. 8, 2013, 9 pages.
Gedymin, "Cloud computing with an emphasis on Google App Engine," Master Final Project, Sep. 2011, 146 pages.
Google Docs, http://web.Archive.org/web/20100413105758/http://en.wikipedia.org/wiki/Google_docs, Apr. 13, 2010, 6 pages.
International Search Report and Written Opinion for PCT/US2013/039782, Applicant: Box, Inc., Mailed Aug. 28, 2013, 15 pages.
International Search Report and Written Opinion for PCT/US2011/039126 mailed on Oct. 6, 2011, pp. 1-13.
International Search Report and Written Opinion for PCT/US2011/041308 Mailed Jul. 2, 2012. pp. 1-16.
International Search Report and Written Opinion for PCT/US2011/056472 mailed on Jun. 22, 2012, pp. 1-12.
International Search Report and Written Opinion for PCT/US2011/060875 Mailed Oct. 30, 2012, pp. 1-10.
International Search Report and Written Opinion for PCT/US2008/012973 dated Apr. 30, 2009, pp. 1-3.
Langfeld L. et al., "Microsoft SharePoint 2003 Unleashed," Chapters 11 and 15, Jun. 2004, pp. 403-404, 557-561, 578-581.
Partial International Search Report for PCT/US2011/041308 dated Feb. 27, 2012, pp. 1-2.
Supplementary European Search Report European Application No. EP 08 85 8563 dated Jun. 20, 2011 pp. 1-5.
Exam Report for EP13168784.0, Applicant: Box, Inc. Mailed Nov. 21, 2013, 7 pages.
Exam Report for EP13185269.1, Applicant: Box, Inc. Mailed Jan. 28, 7 pages.
Exam Report for GB1311417.8, Applicant: Box, Inc. Mailed Dec. 20, 2013, 5 pages.
Exam Report for GB1312095.1, Applicant: Box, Inc. Mailed Dec. 12, 2013, 7 pages.
Exam Report for GB1312874.9, Applicant: Box, Inc. Mailed Dec. 20, 2013, 11 pages.
Exam Report for GB1314771.5, Applicant: Box, Inc. Mailed Feb. 17, 2014, 7 pages.
Exam Report for GB1316971.9, Applicant: Box, Inc. Mailed Nov. 26, 2013, 10 pages.
Exam Report for GB1317600.3, Applicant: Box, Inc. Mailed Nov. 21, 2013, 8 pages.
Exam Report for GB1318373.6, Applicant: Box, Inc. Mailed Dec. 17, 2013, 4 pages.
Exam Report for GB1320902.8, Applicant: Box, Inc. Mailed Dec. 20, 2013, 4 pages.
International Search Report and Written Opinion for PCT/US2013/034765, Applicant: Box, Inc., Mailed Jan. 20, 2014, 15 pages.
Patent Court Document of Approved Judgment for GB0602349.3 and GB0623571.7; Mar. 3, 2009, 17 pages.
Exam Report for GB1308842.2, Applicant: Box, Inc. Mailed Mar. 10, 2014, 4 pages.
Burns, "Developing Secure Mobile Applications for Android," Oct. 2008, Version 1.0, 1-28 pages.
Search Report for EP 11729851.3, Applicant: Box, Inc. Mailed Feb. 7, 2014, 9 pages.
Comes, "MediaXchange User's Manual," Version 1.15.15, Feb. 1, 2009, pp. 1-90.
"Average Conversion Time for a D60 RAW file?" http://www.dpreview.com, Jul. 22, 2002, 4 pages.
Exam Report for GB1312264.3, Applicant: Box, Inc. Mailed Mar. 24, 2014, 7 pages.
Search Report for EP14153783.7, Applicant: Box, Inc. Mailed Mar. 24, 2014, 7 pages.
"Understanding Metadata," National Information Standards Organization, NISO Press, 2004, 20 pages.
International Search Report and Written Opinion for PCT/US2012/056955, Applicant: Box, Inc., Mailed Mar. 27, 2013, pp. 1-11.
International Search Report and Written Opinion for PCT/US2011/047530, Applicant: Box, Inc., Mailed Mar. 22, 2013, pp. 1-10.
International Search Report and Written Opinion for PCT/US2012/065617, Applicant: Box, Inc., Mailed Mar. 29, 2013, 9 pages.
International Search Report and Written Opinion for PCT/US2012/067126, Applicant: Box, Inc., Mailed Mar. 29, 2013, 10 pages.
International Search Report and Written Opinion for PCT/US2012/063041, Applicant: Box, Inc., Mailed Mar. 29, 2013, 12 pages.
International Search Report and Written Opinion for PCT/US2011/057938, Applicant: Box, Inc., Mailed Mar. 29, 2013, 10 pages.
Parr, "Google Docs Improves Commenting, Adds E-mail Notifications," Apr. 16, 2011, mashable.com, pp. 1-6.
"Microsoft Office SharePoint 2007 User Guide," Feb. 16, 2010, pp. 1-48.
Lars, "35 Very Useful Online Tools for Improving your project Management and Team Collaboration," Apr. 31, 2010, tripwiremagazine.com, pp. 1-32.
Internet Forums, http://web.archive.org/web/20100528195550/http://en.wikipedia.org/wiki/Internet_forums, Wikipedia, May 30, 2010, pp. 1-20.
Yahoo! Groups, http://web.archive.org/web/20090320101529/http://en.wikipedia.org/wiki/Yahoo!_Groups, Wikipedia, Mar. 20, 2009, pp. 1-6.

(56) References Cited

OTHER PUBLICATIONS

Wiki, http://web.archive.org/web/20100213004936/http://en.wikipedia.org/wiki/Wiki, Feb. 13, 2010, pages 1-16.
Conner, "Google Apps: The Missing Manual," published by O'Reilly Media, May 27, 2008, 24 pages.
Cisco, "FTP Load Balancing on ACE in Routed Mode Configuration Example," DocWiki, Jun. 2011, 7 pages.
Palmer, "Load Balancing FTP Servers," BlogNav, Oct. 2008, 2 pages.
Wayback, "Wayback machine," Wayback, Jun. 1, 2011, 1 page.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
"How-to Geek, How to Sync Specific Folders With Dropbox," downloaded from the internet http://www.howtogeek.com, Apr. 23, 2013, 5 pages.
Exam Report for EP13158415.3, Applicant: Box, Inc. Mailed Jun. 4, 2013, 8 pages.
Exam Report for GB1300188.8, Applicant: Box, Inc. Mailed May 31, 2013, 8 pages.
Exam Report for GB1306011.6, Applicant: Box, Inc. Mailed Apr. 18, 2013, 8 pages.
International Search Report and Written Opinion for PCT/US2010/070366, Applicant: Box, Inc., Mailed Apr. 24, 2013, 10 pages.
International Search Report and Written Opinion for PCT/US2013/020267, Applicant: Box, Inc., Mailed May 7, 2013, 10 pages.
International Search Report and Written Opinion for PCT/US2013/023889, Applicant: Box, Inc., Mailed Jun. 24, 2013, 13 pages.
International Search Report and Written Opinion for PCT/US2013/029520, Applicant: Box, Inc., Mailed Jun. 26, 2013, 10 pages.
International Search Report and Written Opinion for PCT/US2013/034662, Applicant: Box, Inc., Mailed May 31, 2013, 10 pages.
International Search Report and Written Opinion for PCT/US2013/035404, Applicant: Box, Inc., Mailed Jun. 26, 2013, 13 pages.
"Revolving sync conflicts; frequently asked questions," Microsoft Tech Support, Jul. 16, 2012, retrieved from the Internet: http://web.archive.org/web, 2 pages.
"Troubleshoot sync problems," Microsoft Tech Support: May 2, 2012, retrieved from the internet, http://web.Archive.org/web, 3 pages.
"Tulsa TechFest 2012—Agenda," retrieved from the website, http://web.archive.org, Oct. 2, 2012, 2 pages.
Cohen, "Debating the Definition of Cloud Computing Platforms," retrieved from the internet, http://forbes.com, Feb. 3, 2014, 7 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP13177108.1, Applicant: Box, Inc. Mailed May 26, 2014, 6 pages.
Exam Report for GB1318792.7, Applicant: Box, Inc. Mailed May 22, 2014, 2 pages.
John et al., "Always Sync Support Forums—View topic—Allway sync funny behavior," Allway Sync Support Forum at http://sync-center.com, Mar. 28, 2011, XP055109680, 2 pages.
Partial Search Report for EP131832800, Applicant: Box, Inc. Mailed May 8, 2014, 5 pages.
Pyle et al., "How to enable Event logging for Offline Files (Client Side Caching) in Windows Vista," Feb. 18, 2009, retrieved from the internet: http://blogs.technet.com, 3 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Search Report for EP13187217.8, Applicant: Box, Inc. Mailed Apr. 15, 2014, 12 pages.
Search Report for EP141509422, Applicant: Box, Inc. Mailed May 8, 2014, 7 pages.
Search Report for EP14151588.2, Applicant: Box, Inc. Mailed Apr. 15, 2014, 12 pages.
Sommerer, "Presentable Document Format: Improved On-demand PDF to HTML Conversion," retrieved from the internet, http://research.microsoft.com, 8 pages.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
Exam Report for GB1410569.6 Applicant: Box, Inc. Mailed Jul. 11, 2014, 9 pages.
Extended Search Report for EP131832800, Applicant: Box, Inc. Mailed Aug. 25, 2014, 7 pages.
Extended Search Report for EP141509422, Applicant: Box, Inc. Mailed Aug. 26, 2014, 12pages.
Search Report for Ep 13189144.2 Applicant: Box, Inc. Mailed Sep. 1, 2014, 9 pages.
Exam Report for GB1312874.9 Applicant: Box, Inc. Mailed Sep. 26, 2014, 2 pages.
Exam Report for GB1415126.0 Applicant: Box, Inc. Mailed Oct. 2, 2014, 8 pages.
Exam Report for GB1415314.2 Applicant: Box, Inc. Mailed Oct. 7, 2014, 6 pages.
Exam Report for GB1309209.3 Applicant: Box, Inc. Mailed Oct. 7, 2014, 3 pages.
Exam Report for GB1315232.7 Applicant: Box, Inc. Mailed Oct. 9, 2014, 5 pages.
Exam Report for GB1318789.3 Applicant: Box, Inc. Mailed Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. Mailed Nov. 7, 2014, 6 pages.
Exam Report for GB1311417.8 Applicant: Box, Inc. Mailed Nov. 7, 2014, 2 pages.
Exam Report for GB1311421.0 Applicant: Box, Inc. Mailed Nov. 7, 2014, 4 pages.
Exam Report for GB1316682.2 Applicant: Box, Inc. Mailed Nov. 19, 2014, 6 pages.
Exam Report for GB1312095.1 Applicant: Box, Inc. Mailed Nov. 19, 2014, 5 pages.
Exam Report for GB1313559.5 Applicant: Box, Inc. Mailed Nov. 4, 2014, 2 pages.
User's Guide for SMART Board Software for Windows, published Dec. 2004, 90 pages.
Zambonini et al., "Automated Measuring of Interaction with User Interfaces," Published as WO2007113573 Oct. 2007, 19 pages.
Exam Report for GB1309209.3 Applicant: Box, Inc. Mailed Jan. 19, 2015, 6 pages.
"Agilewords—How to Request Approval," YouTube, http://www.youtube.com/watch?v=3-Ov3DYNN3Q, Jan. 31, 2011, 2 page.
"Agilewords—Features, Powerful Features Yet Simple," Jun. 1, 2011, http://web.archive.org/web/20110601223756/http://agilewords.com/product/features, 3 pages.
Conner, "Google Apps: The Missing Manual," published by O'Reilly Media, May 27, 2008, 42 pages.
Exam Report for EP 13177108.1, Applicant: Box, Inc. Mailed Feb. 17, 2015, 6 pages.
Exam Report for GB1312264.3 Applicant: Box, Inc. Mailed Jan. 30, 2015, 5 pages.
Exam Report for GB1312874.9 Applicant: Box, Inc. Mailed Feb. 10, 2015, 7 pages.
Exam Report for GB1316685.5 Applicant: Box, Inc. Mailed Feb. 17, 2015, 5 pages.
Exam Report for EP 13185269.1, Applicant: Box, Inc. Mailed Feb. 13, 2015, 8 pages.
U.S. Appl. No. 60/992,656, filed Dec. 5, 2007 Methods and Systems for Open Source Collaboration in an Application Service Provider Environment.

(56) References Cited

OTHER PUBLICATIONS

U.S. Appl. No. 61/055,901, filed May 23, 2008 Methods and Systems for Open Source Integration.
U.S. Appl. No. 14/073,502, filed Nov. 6, 2013 Methods and Systems for Open Source Collaboration in an Application Service Provider Environment.
U.S. Appl. No. 61/434,810, filed Jan. 20, 2011 Real Time Notifications of Activity and Real-Time Collaboration in a Cloud-Based Environment With Applications in Enterprise Settings.
U.S. Appl. No. 13/152,982, filed Jun. 3, 2011 Real Time Notification of Activities that Occur in a Web-Based Collaboration Environment.
U.S. Appl. No. 13/166,733, filed Jun. 22, 2011 Multimedia Content Preview Rendering in a Cloud Content Management System.
U.S. Appl. No. 61/551,894, filed Oct. 26, 2011 Enhanced Multimedia Content Preview Rendering in a Cloud Content Management System.
U.S. Appl. No. 13/590,012, filed Aug. 20, 2012 Preview Pre-Generation Based on Heuristics and Algorithmic Prediction/Assessment of Predicted User Behavior for Enhancement of User Experience.
U.S. Appl. No. 13/297,230, filed Nov. 15, 2011 Enhanced Multimedia Content Preview Rendering in a Cloud Content Management.
U.S. Appl. No. 61/592,567, filed Jan. 30, 2012 Preview Pre-Generation Based on Heuristics and Algorithmic Prediction/Assessment of Predicted User Behavior for Enhancement of User Experience.
U.S. Appl. No. 61/506,013, filed Jul. 8, 2011 Collaboration Sessions in a Workspace on a Workspace on a Cloud-Based Content Management System.
U.S. Appl. No. 13/208,615, filed Aug. 12, 2011 Collaboration Sessions in a Workspace on a Cloud-Based Content Management System.
U.S. Appl. No. 61/592,394, filed Jan. 30, 2012 Extended Applications of Multimedia Content Previews in the Cloud-Based Content Management System.
U.S. Appl. No. 13/588,356, filed Aug. 17, 2012 Extended Applications of Multimedia Content Previews in the Cloud-Based Content Management System.
U.S. Appl. No. 13/968,357, filed Aug. 15, 2013 Automatic and Semi-Automatic Tagging Features of Work Items in a Shared Workspace for Metadata Tracking in a Cloud-Based Content Management System With Selective or Optional User Contribution.
U.S. Appl. No. 61/538,782, filed Sep. 23, 2011 Central Management and Control of User-Contributed Content in a Web-Based Collaboration Environment and Management Console Thereof.
U.S. Appl. No. 13/547,264, filed Jul. 12, 2012 Central Management and Control of User-Contributed Content in a Web-Based Collaboration Environment and Management Console Thereof.
U.S. Appl. No. 13/165,725, filed Jun. 21, 2011 Batch Uploading of Content to a Web-Based Collaboration Environment.
U.S. Appl. No. 61/505,999, filed Jul. 11, 2011 Desktop Application for Access and Interaction with Workspaces in a Cloud-Based Content Management System and Synchronization Mechanisms Thereof.
U.S. Appl. No. 13/282,427, filed Oct. 26, 2011 Desktop Application for Access and Interaction with Workspaces in a Cloud-Based Content Management System and Synchronization Mechanisms Thereof.
U.S. Appl. No. 61/554,450, filed Nov. 1, 2011 Platform and Application Independent Method for Document Editing and Version Tracking Via a Web Browser.
U.S. Appl. No. 13/332,319, filed Dec. 20, 2011 Platform and Application Independent System and Method for Networked File Access and Editing.
U.S. Appl. No. 13/414,480, filed Mar. 7, 2012 Universal File Type Preview for Mobile Devices.
U.S. Appl. No. 61/564,425, filed Nov. 29, 2011 Mobile Platform Folder Synchronization and Offline Synchronization.
U.S. Appl. No. 61/568,430, filed Dec. 8, 2011 Mobile Platform File and Folder Selection Functionalities for Offline Access and Synchronization.
U.S. Appl. No. 13/689,544, filed Nov. 29, 2012 Mobile Platform File and Folder Selection Functionalities for Offline Access and Synchronization.
U.S. Appl. No. 13/345,502, filed Jan. 6, 2012 System and Method for Actionable Event Generation for Task Delegation and Management Via a Discussion Forum in a Web-Based Collaboration Environment.
U.S. Appl. No. 13/619,439, filed Sep. 14, 2012 Batching Notifications of Activities That Occur in a Web-Based Collaboration Environment.
U.S. Appl. No. 61/560,685, filed Nov. 16, 2011 Temporal and Spatial Processing and Tracking of Events in a Web-Based Collaboration Environment for Asynchronous Delivery in an Ordered Fashion.
U.S. Appl. No. 13/524,501, filed Jun. 15, 2012 Resource Effective Incremental Updating of a Remote Client With Events Which Occurred Via a Cloud-Enabled Platform.
U.S. Appl. No. 13/526,437, filed Jun. 18, 2012 Managing Updates at Clients Used by a User to Access a Cloud-Based Collaboration Service.
U.S. Appl. No. 61/579,551, filed Dec. 22, 2011 System Status Monitoring and Data Health Checking in a Collaborative Environment.
U.S. Appl. No. 13/464/813, filed Apr. 4, 2012 Health Check Services for Web-Based Collaboration Environments.
U.S. Appl. No. 13/405,164, filed Feb. 24, 2012 System and Method for Promoting Enterprise Adoption of a Web-Based Collaboration Environment.
U.S. Appl. No. 13/431,645, filed Mar. 27, 2012 Cloud Service or Storage Use Promotion Via Partnership Driven Automatic Account Upgrades.
U.S. Appl. No. 61/620,554, filed Apr. 5, 2012 Device Pinning Capability for Enterprise Cloud Service and Storage Accounts.
U.S. Appl. No. 13/493,922, filed Jun. 11, 2012 Device Pinning Capability for Enterprise Cloud Service and Storage Accounts.
U.S. Appl. No. 61/649,869, filed Mar. 21, 2012 Selective Application Access Control Via a Cloud-Based Service for Security Enhancement.
U.S. Appl. No. 13/493,783, filed Jun. 11, 2012 Security Enhancement Through Application Access Control.
U.S. Appl. No. 61/702,948, filed Sep. 19, 2012 Cloud-Based Platform Enabled With Media Content Indexed for Text-Based Searches and/or Metadata Extraction.
U.S. Appl. No. 13/829,663, filed Mar. 14, 2013 Cloud-Based Platform Enabled With Media Content Indexed for Text-Based Searches and/or Metadata Extraction.
U.S. Appl. No. 61/702,662, filed Sep. 18, 2012 Sandboxing Individual Applications to Specific User Folders in a Cloud-Based Service.
U.S. Appl. No. 13/830,016, filed Mar. 14, 2013 Sandboxing Individual Applications to Specific User Folders in a Cloud-Based Service.
U.S. Appl. No. 61/620,568, filed Apr. 5, 2012 Synchronization Client Selective Subfolder Syncing in a Cloud-Based Environment.
U.S. Appl. No. 13/856,607, filed Apr. 4, 2013 Method and Apparatus for Selective Subfolder Synchronization in a Cloud-Based Environment.
U.S. Appl. No. 61/622,868, filed Apr. 11, 2012 Web and Desktop Client Synchronization of Mac Packages With a Cloud-Based Platform.
U.S. Appl. No. 13/618/993, filed Sep. 14, 2012 Cloud Service Enabled to Handle a Set of Files Depicted to a User as a Single File in a Native Operating System.
U.S. Appl. No. 61/643,116, filed May 4, 2012 Hbase Redundancy Implementation for Action Log Framework.
U.S. Appl. No. 13/890,172, filed May 8, 2013 Repository Redundancy Implementation of a System Which Incrementally Updates Clients With Events That Occurred Via a Cloud-Enabled Platform.

(56) References Cited

OTHER PUBLICATIONS

U.S. Appl. No. 13/888,308, filed May 6, 2013 Repository Redundancy Implementation of a System Which Incrementally Updates Clients With Events That Occurred Via a Cloud-Enabled Platform.
U.S. Appl. No. 61/693,521, filed Aug. 27, 2012 Backend Implementation of Synchronization Client Selective Subholder Syncing in a Cloud-Based Environment.
U.S. Appl. No. 14/010,851, filed Aug. 27, 2013 Server Side Techniques for Reducing Database Workload in Implementing Selective Subfolder Synchronization in a Cloud-Based Environment.
U.S. Appl. No. 61/641,824, filed May 2, 2012 Platform and Application Agnostic Method for Seamless File Access in a Mobile Environment.
U.S. Appl. No. 61/650,840, filed May 23, 2012 Platform and Application Agnostic Method for Seamless File Access in a Mobile Environment.
U.S. Appl. No. 61/653,876, filed May 31, 2012 Platform and Application Agnostic Method for Seamless File Access in a Mobile Environment.
U.S. Appl. No. 13/886,147, filed May 2, 2013 System and Method for a Third-Party Application to Access Content Within a Cloud-Based Platform.
U.S. Appl. No. 13/897,421, filed May 19, 2013 Methods, Architectures and Security Mechanisms for a Third-Party Application to Access Content in a Cloud-Based Platform.
U.S. Appl. No. 13/898,200, filed May 20, 2013 Metadata Enabled Third-Party Application Access of Content at a Cloud-Based Platform Via a Native Client to The Cloud-Based Platform.
U.S. Appl. No. 13,898,242, filed May 20, 2013 Identification Verification Mechanisms for a Third-Party Application to Access Content in a Cloud-Based Platform.
U.S. Appl. No. 61/667,909, filed Jul. 3, 2012 Highly Available Ftp Servers for a Cloud-Based Service.
U.S. Appl. No. 13/565,136, filed Aug. 2, 2012 Load Balancing Secure Ftp Connections Among Multiple Ftp Servers.
U.S. Appl. No. 13/649,784, (U.S. Pat. No. 8,179,445), Oct. 11, 2012, (May 6, 2014), Highly Available Ftp Servers For A Cloud-Based Service, Hao May 2012.
U.S. Appl. No. 13/937,060, filed Jul. 8, 2013 System and Method for Performing Shard Migration to Support Functions of a Cloud-Based Service.
U.S. Appl. No. 61/668,698, filed Jul. 6, 2012 Identification of People as Search Results From Key-Word Based Searches of Content.
U.S. Appl. No. 13/937,101, filed Jul. 8, 2013 Identification of People as Search Results From Key-Word Based Searches of Content in a Cloud-Based Environment.
U.S. Appl. No. 61/668,791, filed Jul. 6, 2012 Systems and Methods for Specifying User and Item Identifiers Within an Email Address for Securely Submitting Comments Via Email.
U.S. Appl. No. 13/937,124, filed Jul. 8, 2013 Systems and Methods for Securely Submitting Comments Among Users Via External Messaging Applications in a Cloud-Based Platform.
U.S. Appl. No. 61/673,671, filed Jul. 19, 2012 Data Loss Prevention Methods and Architectures in a Cloud Service.
U.S. Appl. No. 13/944,184, filed Jul. 17, 2013 Data Loss Prevention (Dlp) Methods and Architectures by a Cloud Service.
U.S. Appl. No. 13/944,241, filed Jul. 17, 2013 Data Loss Prevention (Dlp) Methods by a Cloud Service Including Third Party Integration Architectures.
U.S. Appl. No. 61/694,492, filed Aug. 29, 2012 Method of Streaming File Encryption and Decryption to/From a Collaborative Cloud.
U.S. Appl. No. 13/975,827, filed Aug. 26, 2013 Method of Streaming File Encryption and Decryption to/From a Collaborative Cloud.
U.S. Appl. No. 61/701,823, filed Sep. 17, 2012 Use of a Status Bar Interface Element as a Handle for Revealing Additional Details.
U.S. Appl. No. 13/737,577, filed Jan. 9, 2013 System and Method of a Manipulative Handle in an Interactive Mobile User Interface.
U.S. Appl. No. 61/697,437, filed Sep. 6, 2012 Secure File Portability Between Mobile Applications Using a Server-Based Key Generation Service.
U.S. Appl. No. 13/776,358, filed Feb. 25, 2013 Secure File Portability Between Mobile Applications Using a Server-Based Key Generation Service.
U.S. Appl. No. 61/697,469, filed Sep. 6, 2012 Force Upgrade of a Mobile Application Via Server Side Configuration Files.
U.S. Appl. No. 13/776,467, filed Feb. 25, 2013 Force Upgrade of a Mobile Application Via Server Side Configuration Files.
U.S. Appl. No. 61/697,477, filed Sep. 6, 2012 Disabling the Self-Referential Appearance of a Mobile Application in an Intent Via a Background Registration.
U.S. Appl. No. 13/794,401, filed Mar. 11, 2013 Disabling the Self-Referential Appearance of a Mobile Application in an Intent Via a Background Registration.
U.S. Appl. No. 61/697,511, filed Sep. 6, 2012 Channel for Opening and Editing Files from a Cloud Service Provider Based on Intents.
U.S. Appl. No. 13/776,535, filed Feb. 25, 2013 System and Method for Creating a Secure Channel for Inter-Application Communication Based on Intents.
U.S. Appl. No. 61/694,466, filed Aug. 12, 2012 Optimizations for Client and/or Server Feedback Information Enabled Real Time or Near Real Time Enhancement of Upload/Download Performance.
U.S. Appl. No. 61/702,154, filed Sep. 17, 2012 Optimizations for Client and/or Server Feedback Information Enabled Real Time or Near Real Time Enhancement of Upload/Download Performance.
U.S. Appl. No. 61/703,699, filed Sep. 20, 2012 Optimizations for Client and/or Server Feedback Information Enabled Real Time or Near Real Time Enhancement of Upload/Download Performance.
U.S. Appl. No. 14/293,685, filed Jun. 2, 2014 Enhancement of Upload and/or Download Performance Based on Client and/or Server Feedback Information.
U.S. Appl. No. 61/751,578, filed Jan. 11, 2013 Functionalities, Features, and User Interface of a Synchronization Client to a Cloud-Based Environment.
U.S. Appl. No. 14/153,726, filed Jan. 13, 2014 Functionalities, Features, and User Interface of a Synchronization Client to a Cloud-Based Environment.
U.S. Appl. No. 61/715,208, filed Oct. 17, 2012 Adaptive Architectures for Encryption Key Management in a Cloud-Based Environment.
U.S. Appl. No. 14/056,899, filed Oct. 17, 2013 Remote Key Management in a Cloud-Based Environment.
U.S. Appl. No. 61/709,086, filed Oct. 2, 2012 Visibility, Access Control, Advanced Reporting Api, and Enhanced Data Protection and Security Mechanisms for Administrators in an Enterprise.
U.S. Appl. No. 14/044,261, filed Oct. 2, 2013 System and Method for Enhanced Security and Management Mechanisms for Enterprise Administrators in a Cloud-Based Environment.
U.S. Appl. No. 61/709,653, filed Oct. 4, 2012 Corporate User Discovery and Identification of Recommended Collaborators in a Cloud Platform.
U.S. Appl. No. 14/046,294, filed Oct. 4, 2013 Corporate User Discovery and Identification of Recommended Collaborators in a Cloud Platform.
U.S. Appl. No. 61/709,866, filed Oct. 4, 2012 Enhanced Quick Search Features, Low-Barrier Commenting/Interactive Features in a Collaboration Platform.
U.S. Appl. No. 14/046,523, filed Oct. 4, 2013 Enhanced Quick Search Features, Low-Barrier Commenting/Interactive Features in a Collaboration Platform.
U.S. Appl. No. 61/709,407, filed Oct. 4, 2012 Seamless Access, Editing, and Creation of Files in a Web Interface or Mobile Interface to a Cloud Platform.
U.S. Appl. No. 14/046,726, filed Oct. 4, 2013 Seamless Access, Editing, and Creation of Files in a Web Interface or Mobile Interface to a Collaborative Cloud Platform.
U.S. Appl. No. 61/710,182, filed Oct. 5, 2012 Embedded Html Folder Widget for Accessing a Cloud Collaboration Platform and Content From Any Site.

(56) References Cited

OTHER PUBLICATIONS

U.S. Appl. No. 14/047,223, filed Oct. 7, 2013 System and Method for Generating Embeddable Widgets Which Enable Access to a Cloud-Based Collaboration Platform.
U.S. Appl. No. 61/750,474, filed Jan. 9, 2013 File System Event Monitor and Event Filter Pipeline for a Cloud-Based Platform.
U.S. Appl. No. 14/149,586, filed Jan. 7, 2014 File System in a System Which Incrementally Updates Clients With Events That Occurred in a Cloud-Based Collaboration Platform.
U.S. Appl. No. 61/753,761 Conflict Resolution, Retry Condition Management, and Handling of Problem Files for the Synchronization Client to a Cloud-Based Platform.
U.S. Appl. No. 14/158,626 Conflict Resolution, Retry Condition Management, and Handling of Problem Files for the Synchronization Client to a Cloud-Based Platform.
U.S. Appl. No. 61/739,296, filed Dec. 19, 2012 Synchronization of Read-Only Files/Folders by a Synchronization Client With a Cloud-Based Platform.
U.S. Appl. No. 14/135,311, filed Dec. 19, 2013 Method and Apparatus for Synchronization of Items With Read-Only Permissions in a Cloud-Based Environment.
U.S. Appl. No. 61/748,399, filed Jan. 2, 2013 Handling Action Log Framework Race Conditions for a Synchronization Client to a Cloud-Based Environment.
U.S. Appl. No. 14/146,658, filed Jan. 2, 2014 Race Condition Handling in a System Which Incrementally Updates Clients With Events That Occurred in a Cloud-Based Collaboration Platform.
U.S. Appl. No. 61/822,170, filed May 10, 2013 Identification and Handling of Items to be Ignored for Synchronization With a Cloud-Based Platform by a Synchronization Client.
U.S. Appl. No. 14,275,890, filed May 13, 2014 Identification and Handling of Items to be Ignored for Synchronization With a Cloud-Based Platform by a Synchronization Client.
U.S. Appl. No. 61/822,191, filed May 10, 2013 Systems and Methods for Depicting Item Synchronization With a Cloud-Based Platform by a Synchronization Client.
U.S. Appl. No. 14/275,401, filed May 12, 2014 Top Down Delete or Unsynchronization on Delete of and Depiction of Item Synchronization With a Synchronization Client to a Cloud-Based Platform.
U.S. Appl. No. 61/834,756, filed Jun. 13, 2013 Systems and Methods for Event Building, Collapsing, or Monitoring by a Synchronization Client of a Cloud-Based Platform.
U.S. Appl. No. 14/304,038, filed Jun. 13, 2014 Systems and Methods for Synchronization Event Building and/or Collapsing by a Synchronization Component of a Cloud-Based Platform.
U.S. Appl. No. 61/838,176, filed Jun. 21, 2013 Maintaining and Updating File System Shadows on a Local Device by a Synchronization Client of a Cloud-Based Platform.
U.S. Appl. No. 14/312,482, filed Jun. 23, 2014 Maintaining and Updating File System Shadows on a Local Device by a Synchronization Client of a Cloud-Based Platform.
U.S. Appl. No. 61/839,325, filed Jun. 23, 2013 Systems and Methods for Improving Performance of a Cloud-Based Platform.
U.S. Appl. No. 14/314,887, filed Jun. 25, 2014 Systems and Methods for Managing Upgrades, Migration of User Data and Improving Performance of a Cloud-Based Platform.
U.S. Appl. No. 61/839,331, filed Jun. 25, 2013 Systems and Methods for Providing Shell Communication in a Cloud-Based Platform.
U.S. Appl. No. 14/314,677, filed Jun. 25, 2014 Systems and Methods for Providing Shell Communication in a Cloud-Based Platform.
U.S. Appl. No. 13/954,680, filed Jul. 30, 2013 System and Method for Advanced Control Tools for Administrators in a Cloud-Based Service.
U.S. Appl. No. 61/860,050, filed Jul. 30, 2013 Scalability Improvement in a System Which Incrementally Updates Clients With Events That Occurred in a Cloud-Based Collaboration Platform.
U.S. Appl. No. 14/194,091, filed Feb. 28, 2014 Scalability Improvement in a System Which Incrementally Updates Clients With Events That Occurred in a Cloud-Based Collaboration Platform.
U.S. Appl. No. 13/953,668, filed Jul. 29, 2013 System and Method for Advanced Search and Filtering Mechanisms for Enterprise Administrators in a Cloud-Based Environment.
U.S. Appl. No. 14/026,674, filed Sep. 13, 2013 Configurable Event-Based Automation Architecture for Cloud-Based Collaboration Platforms.
U.S. Appl. No. 61/877,917, filed Sep. 13, 2013 Systems and Methods for Configuring Event-Based Automation in Cloud-Based Collaboration Platforms.
U.S. Appl. No. 14/075,849, filed Nov. 8, 2013 Systems and Methods for Configuring Event-Based Automation in Cloud-Based Collaboration Platforms.
U.S. Appl. No. 14/027,149, filed Sep. 13, 2013 Simultaneous Editing/Accessing of Content by Collaborator Invitation Through a Web-Based or Mobile Application to a Cloud-Based Collaboration Platform.
U.S. Appl. No. 14/042,473, filed Sep. 30, 2013 Simultaneous Editing/Accessing of Content by Collaborator Invitation Through a Web-Based or Mobile Application to a Cloud-Based Collaboration Platform.
U.S. Appl. No. 14/026,837, filed Sep. 13, 2013 Mobile Device, Methods and User Interfaces Thereof in a Mobile Device Platform Featuring Multifunctional Access and Engagement in a Collaborative Environment Provided by a Cloud-Based Platform.
U.S. Appl. No. 14/166,414, filed Jan. 28, 2014 System and Method of a Multi-Functional Managing User Interface for Accessing a Cloud-Based Platform Via Mobile Devices.
U.S. Appl. No. 14/027,147, filed Sep. 13, 2013 System and Method for Rendering Document in Web Browser or Mobile Device Regardless of Third-Party Plug-In Software.
U.S. Appl. No. 61/877,938, filed Sep. 13, 2013 High Availability Architecture for a Cloud-Based Concurrent-Access Collaboration Platform.
U.S. Appl. No. 14/474,507, filed Sep. 2, 2014 High Availability Architecture for a Cloud-Based Concurrent-Access Collaboration Platform.
U.S. Appl. No. 61/894,340, filed Oct. 22, 2013 Desktop Application for Accessing a Cloud Collaboration Platform.
U.S. Appl. No. 14/521,134, filed Oct. 22, 2014 Desktop Application for Accessing a Cloud Collaboration Platform.
U.S. Appl. No. 14/472,540, filed Aug. 29, 2014 Enhanced Remote Key Management for an Enterprise in a Cloud-Based Environment.
U.S. Appl. No. 14/474,008, filed Aug. 28, 2014 Configurable Metadata-Based Automation and Content Classification Architecture for Cloud-Based Collaboration Platforms.

* cited by examiner

FILE MANAGEMENT SYSTEM AND COLLABORATION SERVICE AND INTEGRATION CAPABILITIES WITH THIRD PARTY APPLICATIONS

CROSS-REFERENCE TO RELATED APPLICATIONS

This application is a Continuation application of and claims the benefit of U.S. patent application Ser. No. 12/260,533, filed Oct. 29, 2008, entitled "WEB-BASED FILE MANAGEMENT SYSTEM AND SERVICE", which claims the benefit of U.S. Provisional Patent Application No. 60/992,656, filed Dec. 5, 2007, entitled "METHODS AND SYSTEMS FOR OPEN SOURCE COLLABORATION IN AN APPLICATION SERVICE PROVIDER ENVIRONMENT" and U.S. Provisional Patent Application No. 61/055,901, filed May 23, 2008, entitled "METHODS AND SYSTEMS FOR OPEN SOURCE INTEGRATION," all which are incorporated herein by reference.

This application is further related to U.S. patent application Ser. No. 13/412,549, filed Mar. 5, 2012, entitled "METHODS AND SYSTEMS FOR OPEN SOURCE COLLABORATION IN AN APPLICATION SERVICE PROVIDER ENVIRONMENT", which is a Continuation application of U.S. patent application Ser. No. 13/030,090, now U.S. Pat. No. 8,140,513, filed Feb. 17, 2011, entitled "METHODS AND SYSTEMS FOR OPEN SOURCE COLLABORATION IN AN APPLICATION SERVICE PROVIDER ENVIRONMENT", which claims the benefit of U.S. Provisional Patent Application No. 60/992,656, filed Dec. 5, 2007, entitled "METHODS AND SYSTEMS FOR OPEN SOURCE COLLABORATION IN AN APPLICATION SERVICE PROVIDER ENVIRONMENT" and U.S. Provisional Patent Application No. 61/055,901, filed May 23, 2008, entitled "METHODS AND SYSTEMS FOR OPEN SOURCE INTEGRATION," all which are incorporated herein by reference.

BACKGROUND

A server, or service class computing device, may be used to store files and to provide a website interface for one or more users of this website to access the files. An application developer may wish to make a service available to users of the website. This would allow the users to use the developer's application with the users' files.

In implementing a developer's service through an external website, one approach taken has been for the developer to make alterations to the application programming interface (API) of the software providing the service in order to enable the external software to communicate with the API of the developer's service. Significant resources and time may be required to implement the service through the external website by changing the API of the application providing the service. The developer is typically required to modify the API in a specific way to enable the application to send and accept data to and from the external application.

A provider of a website for file storage, sharing and collaboration may wish to make a plurality of services available to the users. Such users can then access the plurality of services from a single location to use with their files. The provider of the website may therefore wish to facilitate integration of services with its website.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

FIG. 10 depicts an example of a configuration interface, wherein a developer can enter values for a set of parameters to create a service.

FIG. 11 depicts an example of a configuration interface, wherein a developer can enter values for a set of parameters to create an action.

DETAILED DESCRIPTION

Figure 1:
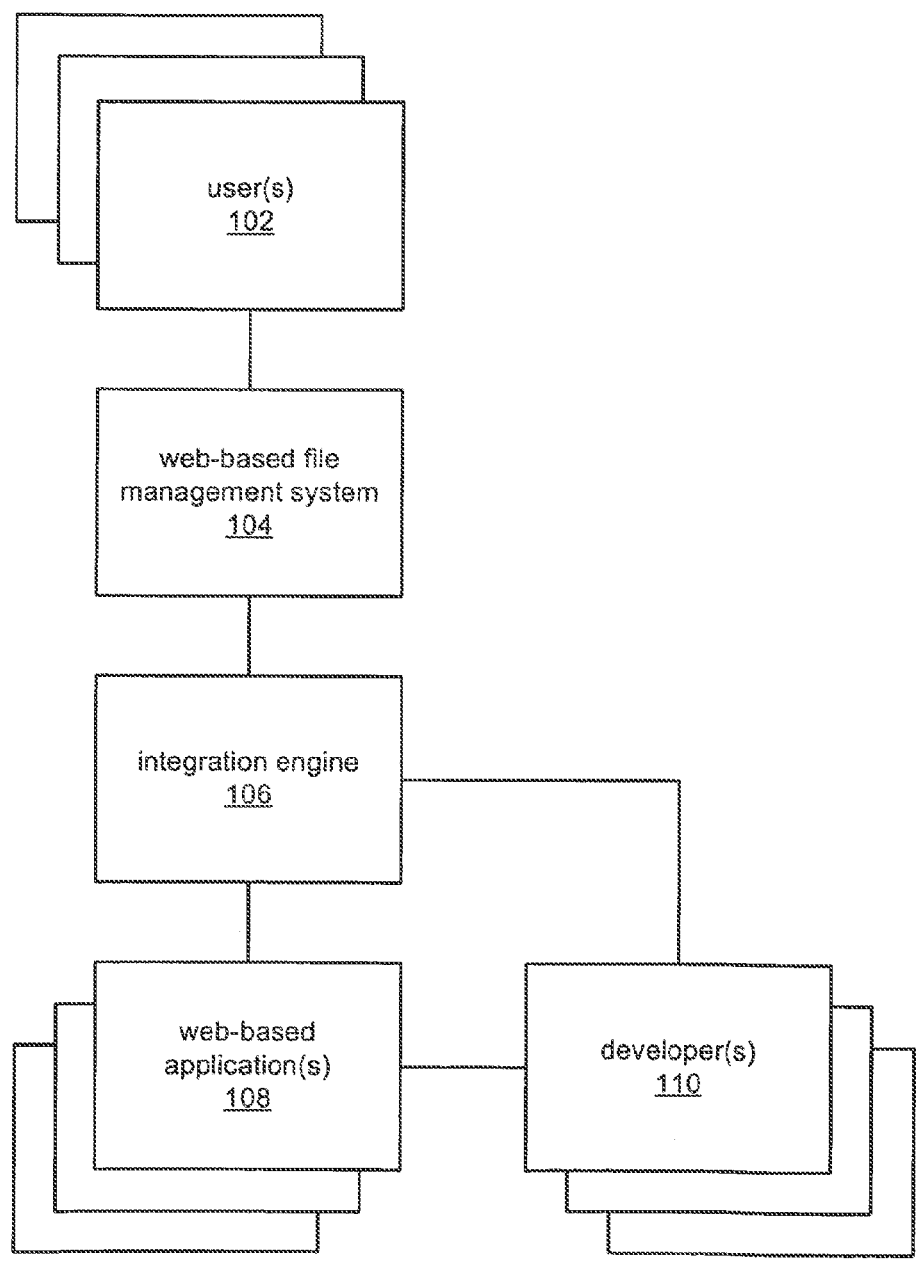
FIG. 1 depicts an example of a system for integrating a web-based file management system (WBFMS) with a web-based application (WBA).

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

A technique provides integration between a computer system storing files, a web based file management system (WBFMS), and a web based application (WBA). The WBA is operable to modify a file, perform another action with the file, or provide some other service. An application developer configures the WBA through an interface to integrate a service into the WBFMS to use the WBA, advantageously, without the application developer having to alter an application programmer interface (API) of the WBA.

An application programming interface (API) may be defined as a set of instructions programmable to cause a WBA to respond to one or more commands. An application or an individual may provide commands in accordance with the API to cause the WBA to perform an action.

To "send a file" includes at least one of the following and may include a combination of the following: send a copy of a file, send an indirection, link, or pointer to the file, send information about the file, or send a part or parts of the file.

The following examples and aspects thereof are described and illustrated in conjunction with systems, tools, and methods that are meant to be exemplary and illustrative, not limiting in scope. In various examples, one or more of the above-described problems have been reduced or eliminated, while other examples are directed to other improvements.

A technique provides an API-agnostic method and system for integrating a web-based file management system with one or more web-based applications to allow users of the web-based file management system to use the web-based application with files stored on the web-based file management system.

A system based on the technique may include a server storing one or more files of one or more users and providing a website for software developers to integrate their application with the website. This would make the application available to users of the website to use with the files stored on the web-based file management system.

A method based on the technique may include transmitting files from the web-based file management system to the web-based application along with a command structure of the API of the web-based application.

An integration engine allows a web-based file management system to provide an interface for an application developer to integrate a service in the web-based file management system, advantageously without the developer having to alter an API of the application providing the service. The integration engine acts as an intermediate between the web-based file management system and the web-based application, allowing them to communicate between each other.

A configuration interface on the web-based file management system provides a way for the developer to set up a service that acts on one or more files of a user of a web-based file management system, upon request of the user. The configuration parameters are stored on the web-based file management system and used whenever the service is requested by a user of the web-based file management system to act on a file stored on the web-based file management system.

A user interface allows a user of a web-based file management system to send, edit or view files that are stored on the web-based file management system with an external application.

FIG. 1 depicts a diagram 100 of an example of a method for API-agnostic integration of two software providers. FIG. 1 includes user(s) 102, web-based file management system (WBFMS) 104, integration engine 106, web-based application (WBA) 108 and developer(s) 110.

In the example of FIG. 1, the user 102 may be an individual or machine acting on behalf of an individual, having access to the internet through a computing device. As an individual, the user 102 may use an internet browser window, such as Internet Explorer or Mozilla Firefox to access the internet.

In the example of FIG. 1, the WBFMS 104 may provide online storage where users of the WBFMS 104 can store their files. The WBFMS 104 may also provide for file sharing and collaboration among users, as well as application services provided locally. The WBFMS 104 may include any computer readable medium capable of storing data. The WBFMS 104 may provide a user interface through which users can access and manage files stored on the WBFMS 104.

In the example of FIG. 1, the integration engine 106 includes a processor executing instructions operable to provide commands to a WBA 108. The integration engine 106 may include an interface for configuring one application to work with the other.

In the example of FIG. 1, the WBA 108 may be software providing services to users through the internet. These services may, in a non-limiting example, include modifying or viewing a file or sending it via fax.

In the example of FIG. 1, the developer(s) 110 may be an individual, organization, or machine acting on behalf of an individual or organization, involved in the development process of an application. The developer(s) 110 may have knowledge of the API of the application.

The user 102 may access the WBFMS 104 via a computing device connected to the internet. The WBFMS 104 may provide online storage wherein users can store files. The user 102 may then upload files to the WBFMS 104 or view files already stored on the WBFMS 104. Files stored on the WBFMS 104 may be used with the WBA 108 via an integration engine 106. The developer(s) 110 are connected to the WBA 108 and to the integration engine 106. The developer(s) 110 may configure the integration engine 106, such that the WBA 108 can integrate with the WBFMS 104, without having to change the API of the service provided by the WBA 108. Integration will be discussed in further detail below, however, as a limited introduction, such configuration typically includes transmitting commands to the integration engine 106 for the integration engine 106 to provide to the WBA 108 along with a file. Upon a request from the user 102 of the WBFMS 104, the integration engine 106 sends the requested file along with a command structure of the API of the WBA 108 to the WBA 108.

Figure 2:
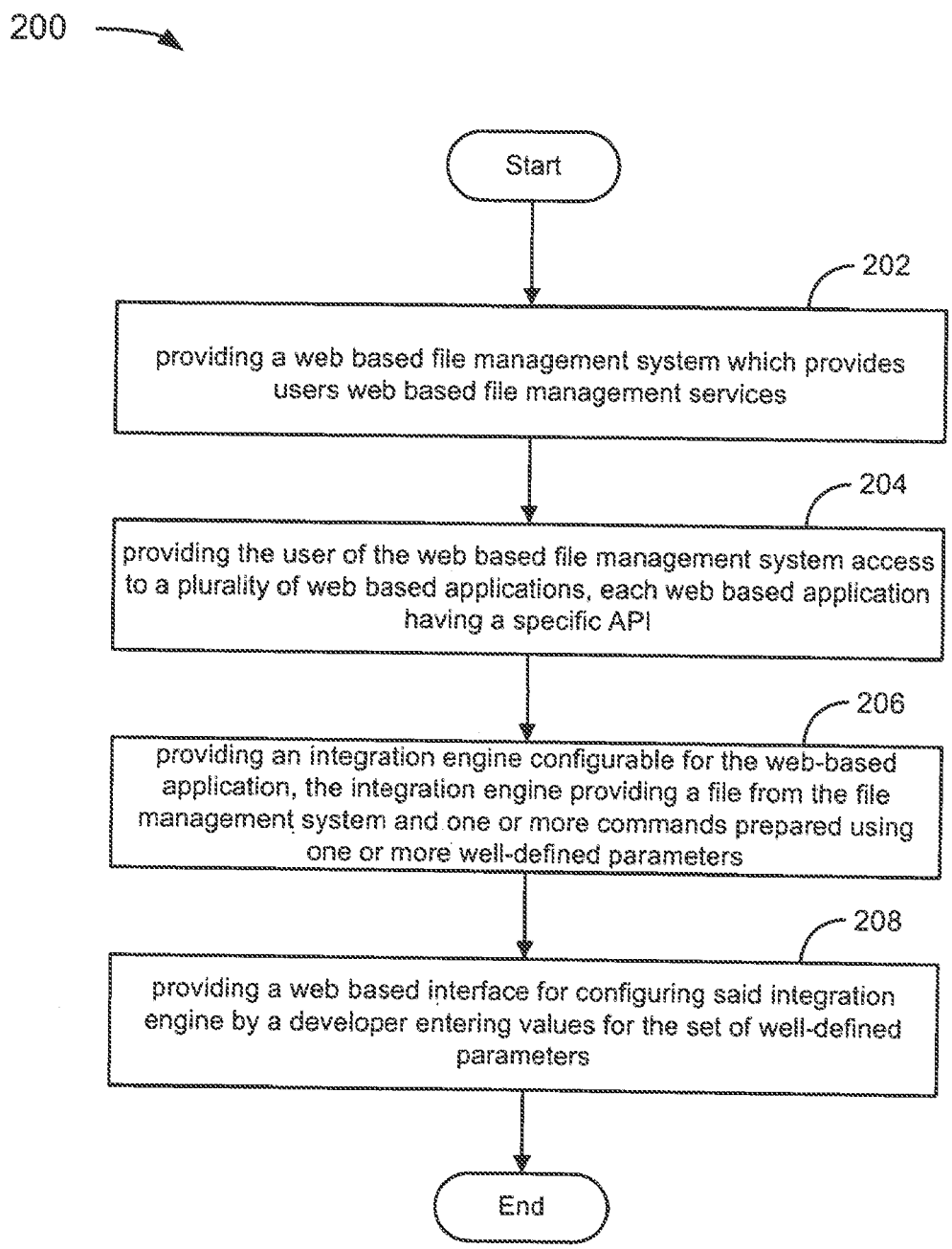
FIG. 2 depicts an example of a flowchart of an API-agnostic method for providing a plurality of WBAs to a user of a WBA.

FIG. 2 depicts an example of a flowchart of an API-agnostic method for providing a plurality of WBAs to a user of a WBA.

In the example of FIG. 2, the flowchart starts at module 202 with providing a web based file management system which provides users web-based file management services. These services may include storing files and providing access to these files to users of the WBFMS.

In the example of FIG. 2, the flowchart continues to module 204 with providing the user of the web-based file management system access to a plurality of web-based applications, each web-based application having a specific API. These WBAs may be used on files stored on the WBFMS and may, in a non-limiting example include modifying or viewing the file.

In the example of FIG. 2, the flowchart continues to module 206 with providing an integration engine configurable for the web-based application, the integration engine providing a file from the file management system and one or more commands prepared using one or more well-defined parameters.

In the example of FIG. 2, the flowchart continues to module 208 with providing a web-based interface for configuring the integration engine by a developer entering values for the set of well-defined parameters. Having provided a web-based interface, the flowchart terminates.

Figure 3:
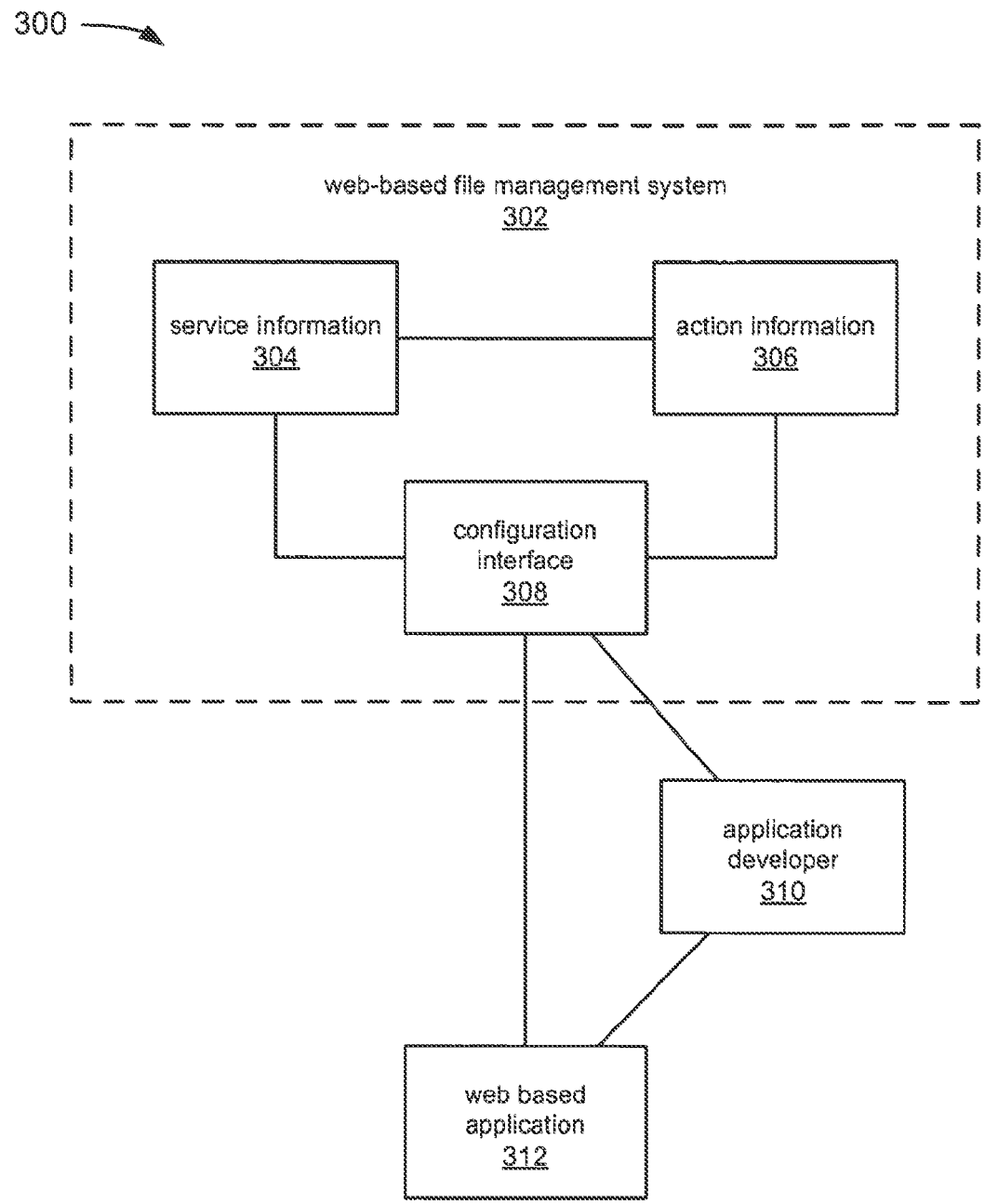
FIG. 3 depicts an example of a system allowing a developer of a web-based application to integrate a service and an action with a web-based file management system through an interface of the web-based file management system.

FIG. 3 depicts an example of a system 300 allowing a developer of a web-based application (WBA) to integrate a service and an action with a web-based file management system through an interface of the web-based file management system (WBFMS).

In the example of FIG. 3, WBFMS 302 includes service information 304, action information 306, and configuration interface 308.

In the example of FIG. 3, the service information 304 may include, but is not limited to, any combination of the following: the name of the service, a description, email contact information for support, a URL to the service description page, access control parameters, one or more pictures identifying the service, and an API key.

The API key is generated by the WBFMS 302 and is used for all actions of the WBA 312 that access the API of the WBFMS 302. In a non-limiting example, the WBA 312 can perform the following functions using the API of the WBFMS 302: store and retrieve files from the WBFMS 312, organize files into folders, move, rename or delete files, and share files.

The access control parameters may define whether the service defined by the service information 304 is visible to all users of the WBFMS 302, or whether it is only accessible to users that know the URL of the service description page.

In the example of FIG. 3, the action information 306 may include, but is not limited to, any combination of the following: a name of the action, a description, a list of supported file extensions, permission information, a command language, a command address, a command response address, one or more commands, and a security parameter.

The permission information defines the availability of an action for shared files on the WBFMS 302. The command language may be specified and is the computer language in which the command of the API is transmitted from one program to another. The security parameters determine whether or not access authentication is required to access the WBA 312.

In the example of FIG. 3, the configuration interface 308 may be a web interface such as an extensible hypertext markup language (XHTML)/hypertext markup language (HTML) form wherein data can be entered.

In the example of FIG. 3, the application developer 310 may be an individual, organization, or machine acting on behalf of an individual or organization, involved in the development process of an application.

In the example of FIG. 3, the WBA 312 may be a computing device executing instructions to provide services to users through the internet. These services may, in a non-limiting example, include modifying or viewing an image file or sending a file by fax.

In the example of FIG. 3, the service information 304 may be provided by the application developer 310 through the configuration interface 308. This information may be stored on a server of the WBFMS 302. The application developer 310 may use the configuration interface 308 to provide the action information 306. This information is then stored on the WBFMS 302. To enable the WBA 312 to accept data from the WBFMS 302, the developer 310 may use the configuration interface 308 to define the commands that are sent and received to and from the WBFMS 302.

Figure 4:
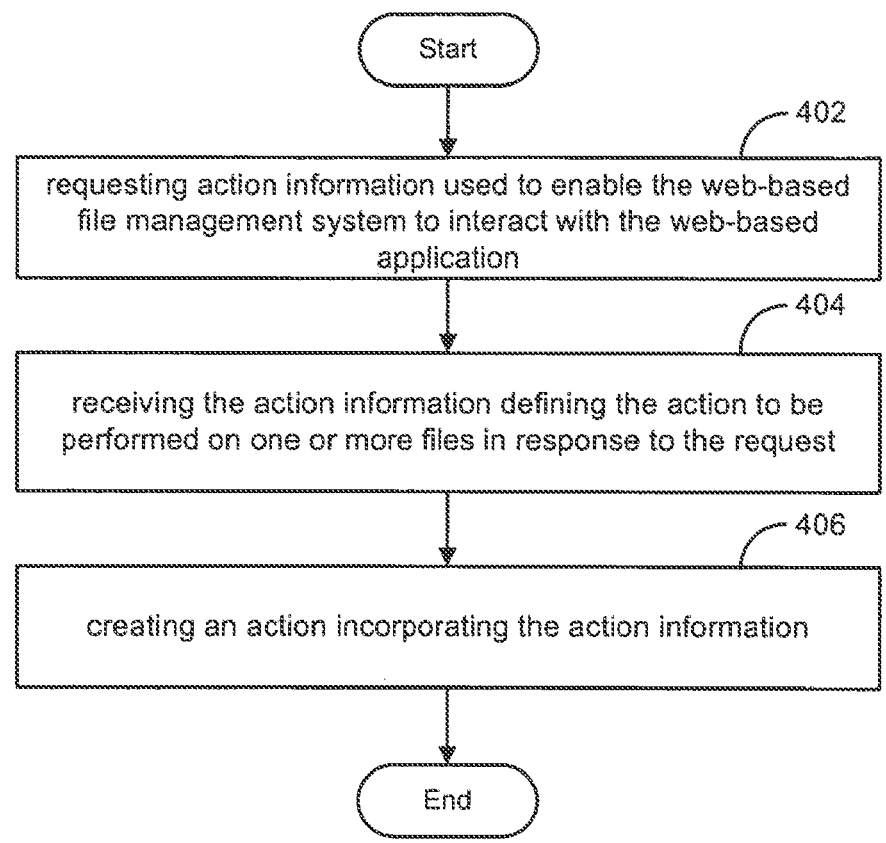
FIG. 4 depicts an example of a flowchart of a method for configuring an action enabling files stored on a web-based file management system to interact with a web-based application.

FIG. 4 depicts a flowchart 400 of an example of a method for configuring an action enabling files stored on a web-based file management system to interact with a web-based application.

In the example of FIG. 4, the flowchart starts at module 402 with requesting action information used to enable the web-based file management system to interact with the web-based application. The WBFMS may send this request to a developer of a WBA wishing to set up a service of the WBA for users of the WBFMS.

In the example of FIG. 4, the flowchart continues to module 404 with receiving the action information to be performed on one or more files in response to the request. The developer of the WBA may provide the action information, which may then be sent to the WBFMS.

In the example of FIG. 4, the flowchart continues to module 406 with creating an action incorporating the action information. This information may then be stored on the WBFMS. Having created the action, the flowchart terminates.

Figure 5:
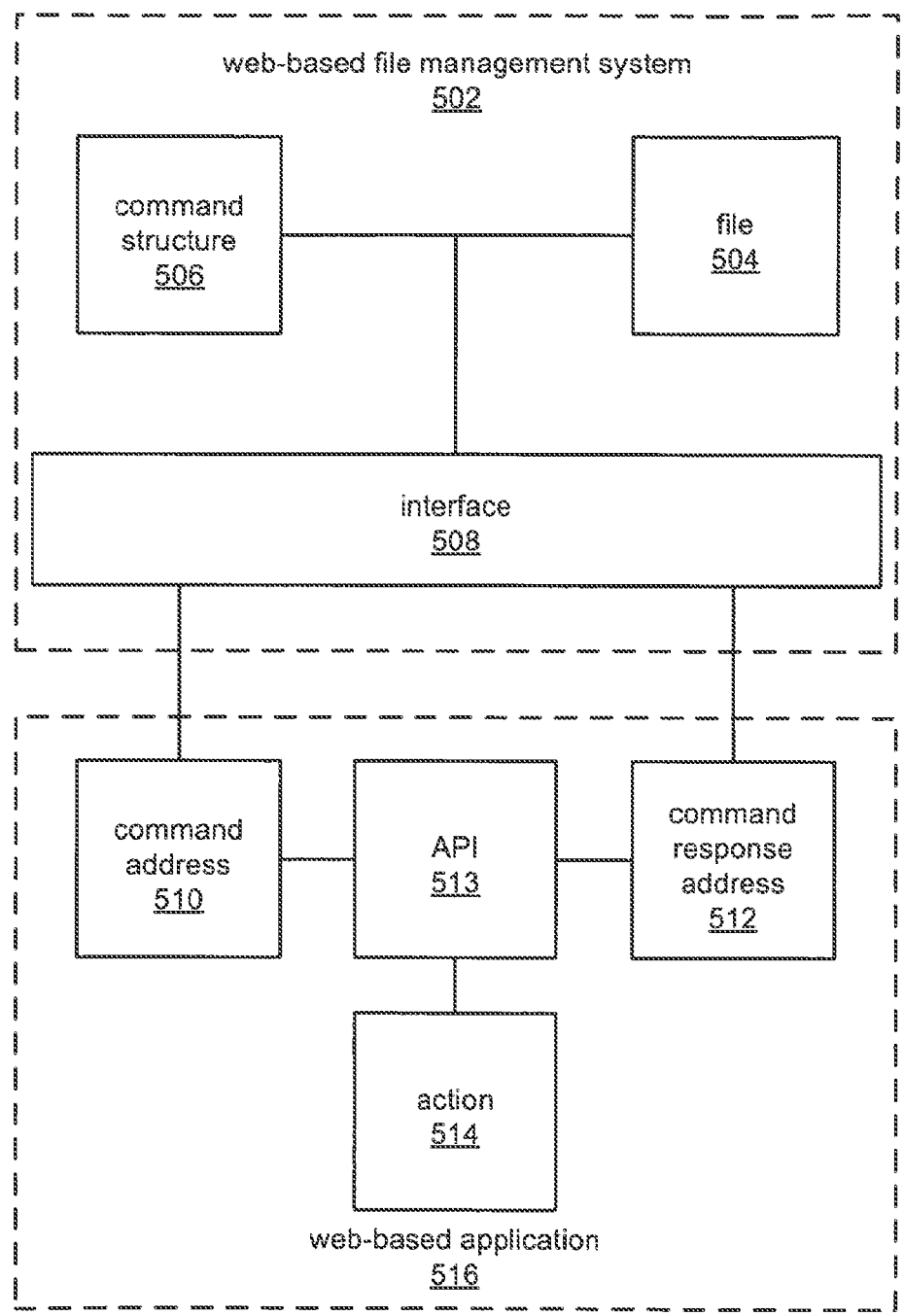
FIG. 5 depicts an example of a system for integrating a web-based file management system with an API of a web-based application.

FIG. 5 depicts a diagram 500 of an example of a method for integrating a web-based file management system with an API of a web-based application. FIG. 5 includes web-based file management system 502, and web-based application 516.

In the example of FIG. 5, web-based file management system 502 includes command structure 506, file 504 and interface 508. In the example of FIG. 5, web-based application 516 includes command address 510, command response address 512, API 513, and action 514.

In the example of FIG. 5, the command structure 506 may include code lines in the language of the API 513 of the web based application 516. The code lines can that provides the functionality described by the API 513.

In the example of FIG. 5, the file 504 may be a sequence of binary digits that can be read by a computer program, and can, in a non-limiting example, be presented to a user as, for example, text, an image, a presentation, or another known or convenient item.

In the example of FIG. 5, the interface 508 is a device that provides communication between information processing systems. The interface 508 may send data to an information processing system, and receive data from the information processing system.

In the example of FIG. 5, the command address 510 may be given by a Uniform Resource Locator (URL).

In the example of FIG. 5, the command response address 512 may be given by a Uniform Resource Locator (URL).

In the example of FIG. 5, the API 513 is an interface enabling computer programs to interact between each other. The API 513 may send commands to instruct a computer program to perform an action on a file.

In the example of FIG. 5, the action 514 may include a computer program acting on a file. In a non-limiting example, this may include modifying or displaying the file, or sending the file to another computer program.

Upon request of a user of the WBFMS 502, the WBFMS 502 sends a file 504 along with a command structure 506 to the WBA 516 through the interface 508. The specific location where the file 504 and command structure 506 are sent is given by the command address 510, and the file 504 and command structure 506 are then forwarded to the API 513. The action 514 is then applied to the file 504 using the API of the WBA 516 in accordance with the command structure 506. The file 504 may be sent back to the WBFMS 502 through the command response address 512, and stored on the WBFMS 502. The user of the WBFMS 502 may choose to either overwrite the original file when the modified file is received, or create a new file, which may be stored on the WBFMS 502. The WBFMS 502 may impose constraints on the write privileges of the user on the files.

Figure 6:
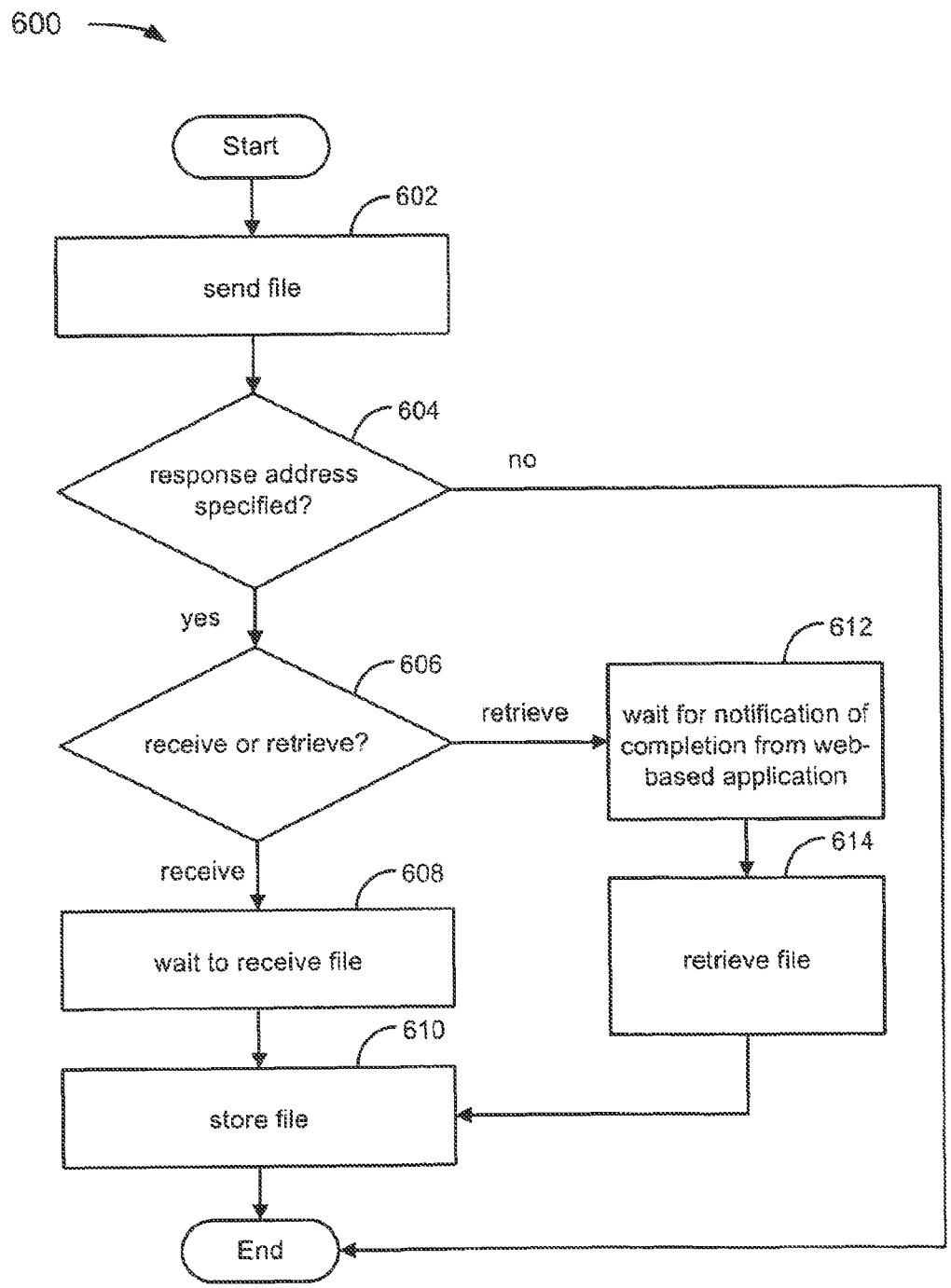
FIG. 6 depicts an example of a flowchart of a method for exchanging files between a web-based file management system and a web-based application.

FIG. 6 depicts a flowchart 600 of an example of a method for exchanging files between a web-based file management system and a web-based application.

In the example of FIG. 6, the flowchart starts at module 602 with sending a file from a WBFMS to a WBA.

In the example of FIG. 6, the flowchart continues to module 604 with determining whether a response address is specified. The response address can be specified by a developer of a WBA and can determine how the file is sent back to the WBFMS.

If the decision at module 604 is yes, then the flowchart continues to module 606 with determining whether to receive or to retrieve? The WBA may be set up to send the file back to the WBFMS upon completion of the requested action on the file. If the WBA is set up to make the file available for download upon completion of the action on the file, the WBFMS may retrieve it from the WBA.

If the decision at module 606 is receive, then the flowchart continues to module 608 with waiting to receive file. The WBFMS waits until the file has been transmitted from the WBA.

In the example of FIG. 6, the flowchart continues to module 610 with storing the file. The file may be stored by the WBFMS on any computer readable medium capable of storing data.

If the decision at module 606 is retrieve, then the flowchart continues to module 612 with waiting for notification of completion from the WBA.

In the example of FIG. 6, the flowchart continues to module 614 with retrieving the file from the WBA. The WBFMS may retrieve the file from the specified response address.

In the example of FIG. 6, the flowchart continues to module 610 with storing the file. Having stored the file on the WBFMS the flowchart terminates.

If the decision at module 604 is no, then the flowchart terminates.

Figure 7:
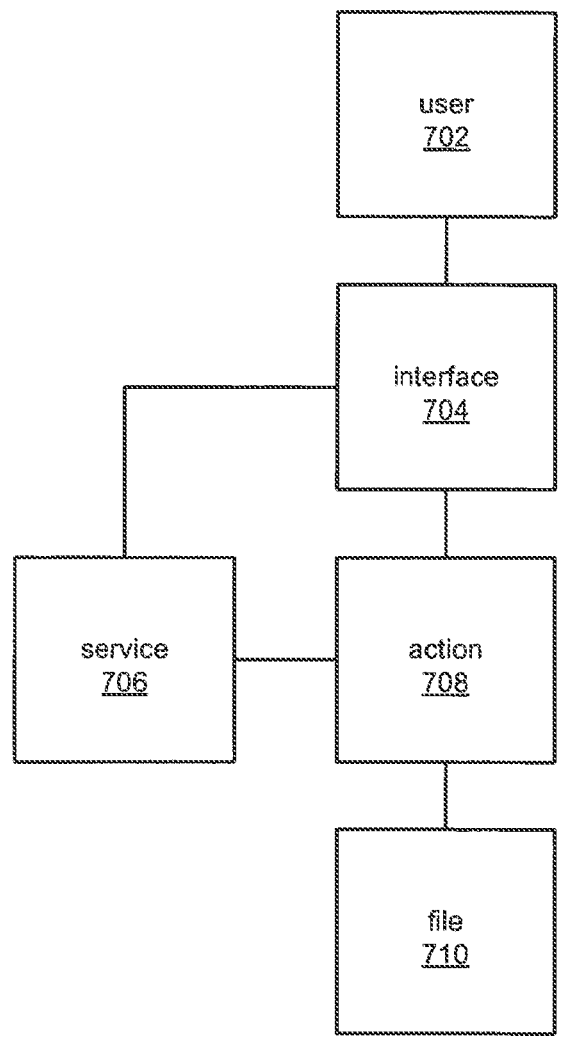
FIG. 7 depicts an example of a system for providing an action of a web-based application to one or more files of a user of a web-based file management system.

FIG. 7 depicts a diagram 700 of an example of a system for providing an action of a web-based application to one or more files of a user of a web-based file management system. FIG. 7 includes user 702, interface 704, service 706, action 708, and file 710.

In the example of FIG. 7, the user 702 may be an individual or machine acting on behalf of an individual, having access to the internet through a computing device. The user 702 may use an internet browser window, such as Internet Explorer, available from Microsoft Corporation of Redmond, Wash., or Firefox, available from Mozilla Corporation of Mountain View, Calif., to access the internet.

In the example of FIG. 7, the configuration interface 704 may be a web interface with an XHTML/HTML form wherein data can be entered.

In the example of FIG. 7, the service 706 may include information on how the service 706 will act on files. The service 706 may include more than one option to modify or display files.

In the example of FIG. 7, the action 708 may include a computer program acting on a file. In a non-limiting example, this may include modifying or displaying the file, or sending the file to another computer program.

In the example of FIG. 7, the file 710 may be a sequence of binary digits that can be read by a computer program, and can, in a non-limiting example, be presented to a user as text, image, or PowerPoint presentation.

In the example of FIG. 7, the interface 704 may include a website allowing the user 702 to access files stored on the WBFMS. The user 702 may be given the option to use the action 708, determined by the service 706, on the file 710.

In the example of FIG. 7, the user 702 may select a service and may receive a file 710, without the action 708 being requested by the user 702. An example of this would be a web-based fax service uploading received faxes to the WBFMS.

Figure 8:
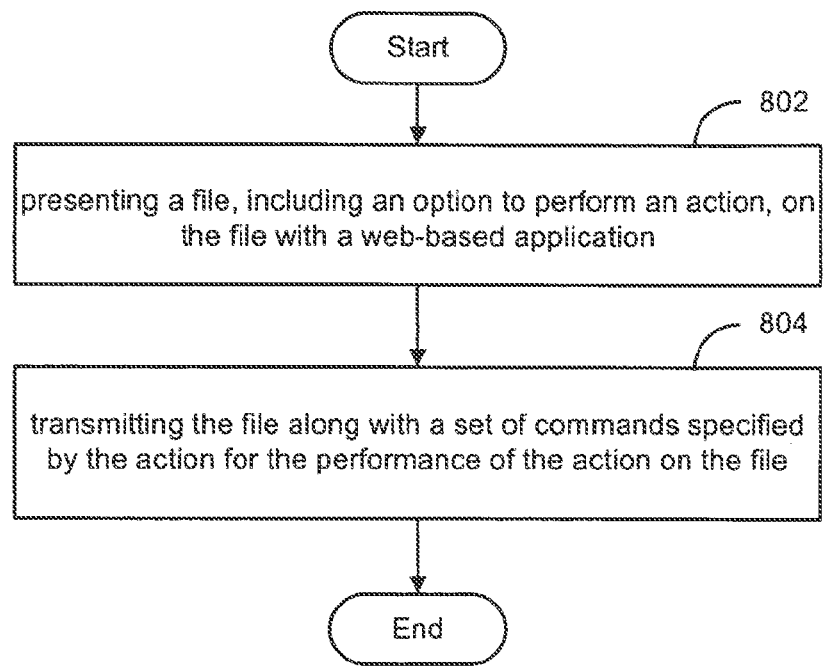
FIG. 8 depicts an example of a flowchart of a method for performing an action on a file.

FIG. 8 depicts a flowchart 800 of an example of a method for providing a user with services from a WBA.

In the example of FIG. 8, the flowchart starts at module 802 with presenting a file, including an option to perform an action on the file, with a WBA. The file may be graphically displayed to a user via, for example, a web browser. The option to perform the action could be graphically represented as a clickable, selectable, or otherwise chosen.

In the example of FIG. 8, the flowchart continues to module 804 with transmitting the file along with a set of commands specified by the action for the performance of the action on the file. The commands instruct an API of a WBA to perform an action on the file. Having transmitted the file along with a set of commands, the flowchart terminates.

Figure 9:
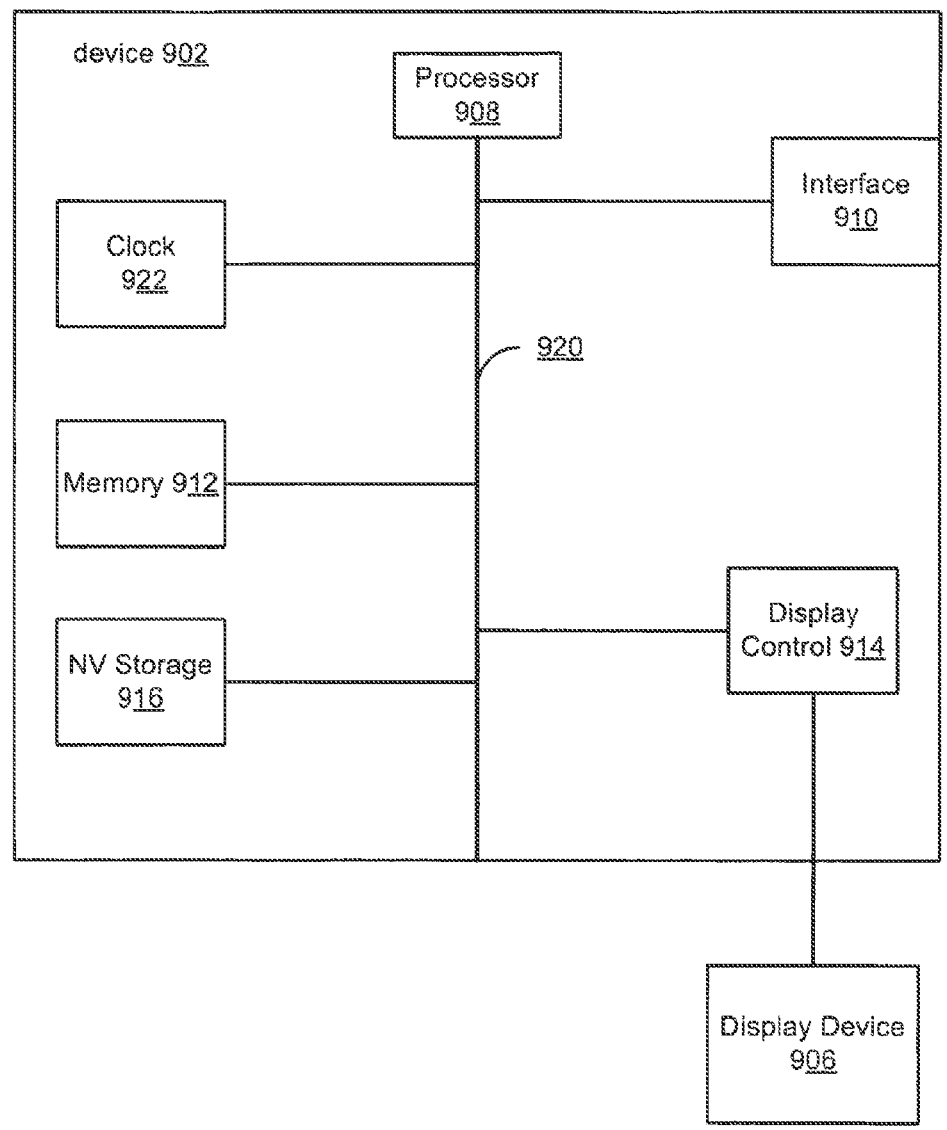
FIG. 9 depicts an example of a device for providing integration of a web-based file management system with a web-based application.

FIG. 9 depicts an example of a system 900 for integrating a web-based file management system with a web-based application through an API-agnostic method. The system 900 may be a conventional computer system that can be used as a client computer system, such as a wireless client or a workstation, or a server computer system. The system 900 includes a device 902, and a display device 906. The device 902 includes a processor 908, a communications interface 910, memory 912, display controller 914, non-volatile storage 916, clock 922. The device 902 may be coupled to or include the display device 906.

The device 902 interfaces to external systems through the communications interface 910, which may include a modem or network interface. It will be appreciated that the communications interface 910 can be considered to be part of the system 900 or a part of the device 902. The communications interface 910 can be an analog modem, ISDN modem or terminal adapter, cable modem, token ring IEEE 802.5 interface, Ethernet/IEEE 802.3 interface, wireless 802.11 interface, satellite transmission interface (e.g. "direct PC"), WiMAX/IEEE 802.16 interface, Bluetooth interface, cellular/mobile phone interface, third generation (3G) mobile phone interface, code division multiple access (CDMA) interface, Evolution-Data Optimized (EVDO) interface, general packet radio service (GPRS) interface, Enhanced GPRS (EDGE/EGPRS), High-Speed Downlink Packet Access (HSPDA) interface, or other interfaces for coupling a computer system to other computer systems.

The processor 908 may be, for example, a conventional microprocessor such as an Intel Pentium microprocessor or Motorola power PC microprocessor. The memory 912 is coupled to the processor 908 by a bus 920. The memory 912 can be Dynamic Random Access Memory (DRAM) and can also include Static RAM (SRAM). The bus 920 couples the processor 908 to the memory 912, also to the non-volatile storage 916, and to the display controller 914.

The display controller 914 may control in the conventional manner a display on the display device 906, which can be, for example, a cathode ray tube (CRT) or liquid crystal display (LCD). The display controller 914 can be implemented with conventional well known technology.

The non-volatile storage 916 is often a magnetic hard disk, flash memory, an optical disk, or another form of storage for large amounts of data. Some of this data is often written, by a direct memory access process, into memory 912 during execution of software in the device 902. One of skill in the art will immediately recognize that the terms "machine-readable medium" or "computer-readable medium" includes any type of storage device that is accessible by the processor 908.

Clock 922 can be any kind of oscillating circuit creating an electrical signal with a precise frequency. In a non-limiting example, clock 922 could be a crystal oscillator using the mechanical resonance of vibrating crystal to generate the electrical signal.

The system 900 is one example of many possible computer systems which have different architectures. For example, personal computers based on an Intel microprocessor often have multiple buses, one of which can be an I/O bus for the peripherals and one that directly connects the processor 908 and the memory 912 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 912 for execution by the processor 908. A Web TV system, which is known in the art, is also considered to be a computer system, but it may lack some of the features shown in FIG. 9, such as certain input or output devices. A typical computer system will usually include at least a processor, memory, and a bus coupling the memory to the processor.

In addition, the system 900 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 916 and causes the processor 908 to execute the various acts required by the operating system to input and output data and to store data in memory, including storing files on the non-volatile storage 916.

Figure 10:
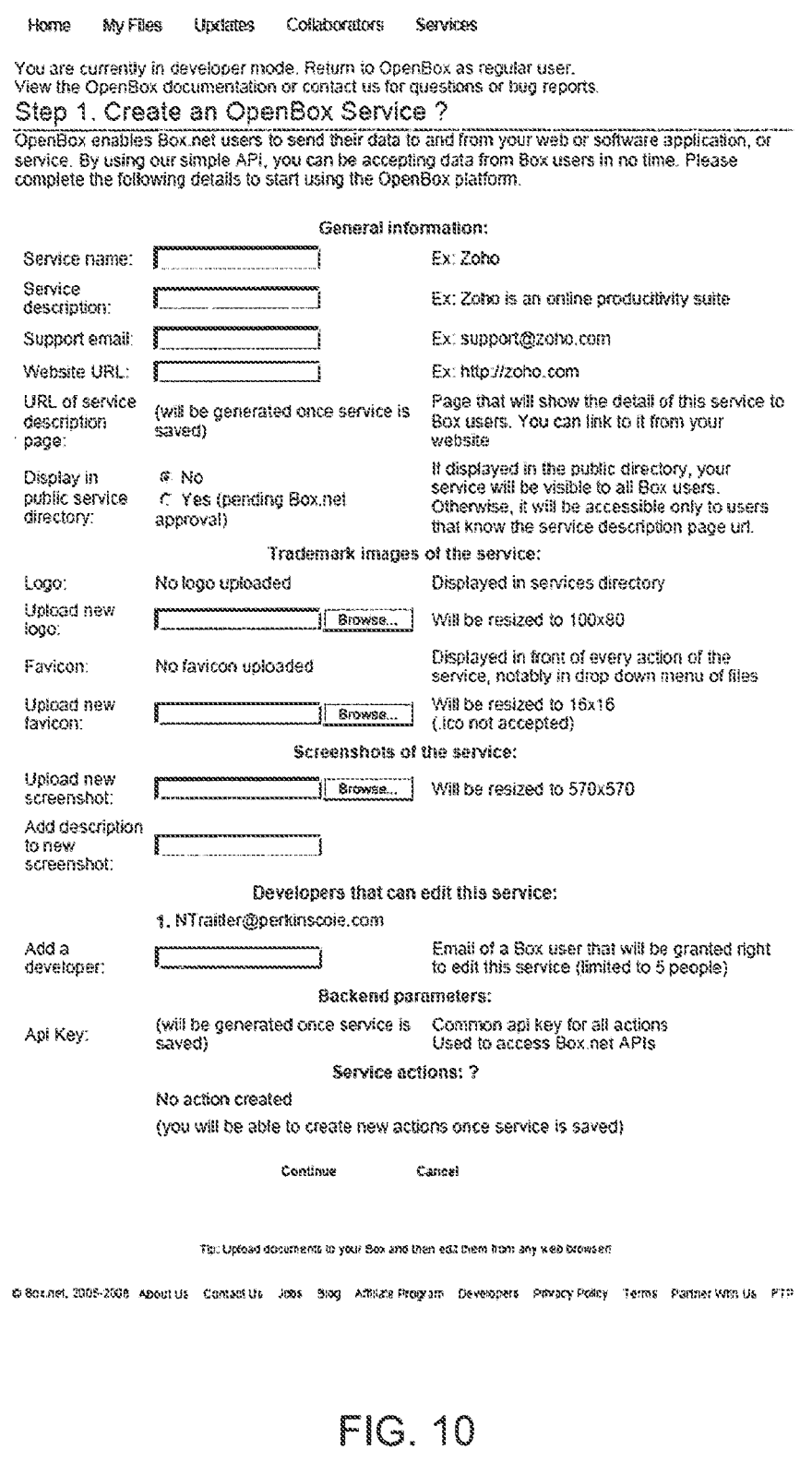

FIG. 10 depicts an example of a configuration interface, wherein a developer can enter values for a set of parameters to create a service.

In the example of FIG. 10, the WBFMS provides a web form, wherein the developer may enter values for well-defined parameters to create a service. Upon approval of the WBFMS, the service is made available to users of the WBFMS, and may be used with files stored on the WBFMS.

In the example of FIG. 10, the parameters may include general information, wherein the information provided by the developer may include the name of the service, a description of the service, an email address for support, a URL to a detailed description of the service, and an option to display the service in a public directory.

In the example of FIG. 10, the parameters may include the option to upload images and screenshots defining the service.

In the example of FIG. 10, the parameters may include the option to grant rights to other developers to edit the service.

In the example of FIG. 10, the parameters may include the option to create an action associated with the service.

Figure 11:
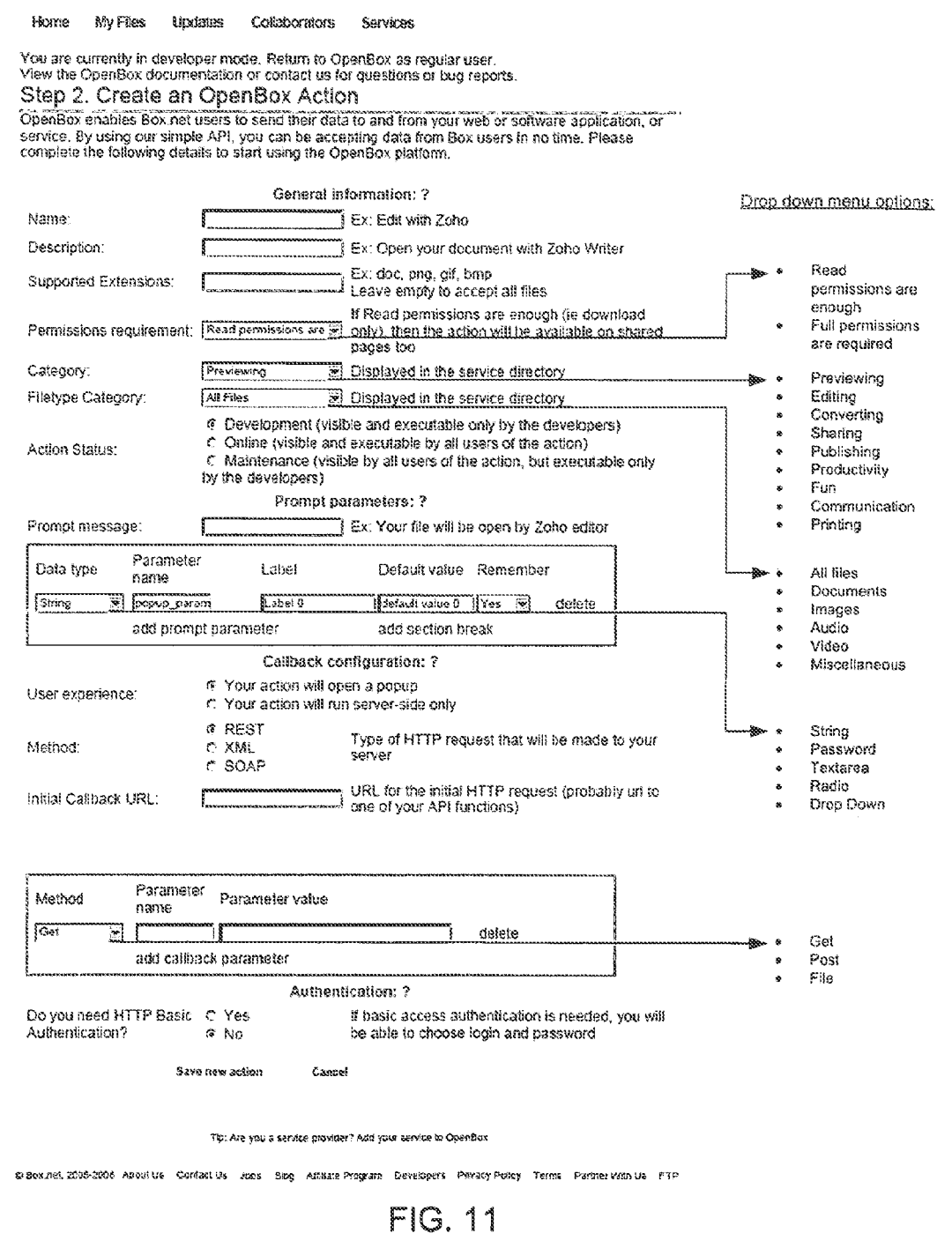

FIG. 11 depicts an example of a configuration interface, wherein a developer can enter values for a set of parameters to create an action.

In the example of FIG. 11, the parameters may include general information about the action, including: the name of action, a description of action, a list of extensions of supported files, permission information defining the availability of an action for shared files on the WBFMS, the category the action falls in, and status information defining whether the action is visible to and executable by the users of the WBFMS.

In the example of FIG. 11, the parameters may include prompt parameters, which define what is shown to the user when the user applies an action to a file stored on the WBFMS. These parameters may include a string, a password prompt, a text area, a radio button, and a drop down menu, or any combination of the above.

In the example of FIG. 11, the developer may configure callback options. These options may include an option to run the service in a new window, the language in which the WBFMS communicates with the WBA, a URL to the command address, and a URL to the command response address.

In the example of FIG. 11, the developer may define the parameters for the commands that are sent from the WBFMS to the WBA.

In the example of FIG. 11, the developer may choose to require authentication from the user of the WBFMS when the action is requested by the user.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is Appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present example also relates to apparatus for performing the operations herein. This Apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other Apparatus. Various general purpose systems may be used with programs in accordance with the teachings herein, or it may prove convenient to construct more specialized Apparatus to perform the required method steps. The required structure for a variety of these systems will appear from the description below. In addition, the present example is not described with reference to any particular programming language, and various examples may thus be implemented using a variety of programming languages.

What is claimed is:

1. A method of a web-based file management system for collaboration, accessible via a website, comprising:
presenting options to perform one or more actions on a shared file stored on the web-based file management system for collaboration;
receiving a selection of the one or more actions to be performed on the shared file;
wherein, the selected one or more actions include a set of commands configured to cause a third-party web-based application to perform the selected one or more actions on the shared file; and
providing the third-party web-based application with access to the shared file along with the set of commands to perform the selected one or more actions on the shared file;
wherein, the web-based file management system for collaboration enables integration with the third-party web-based application via a configuration interface;
presenting options via the configuration interface to set values for one or more pre-defined parameters, the configuration interface accessible to a developer of the third-party web based application;
receiving, via the configuration interface, input values for the one or more predefined parameters; and
in response to receiving the selected one or more actions, generating the set of commands configured to cause the third-party web-based application to perform the selected one or more actions on the shared file, based on the received input values for the one or more predefined parameters.

2. The method of claim 1 wherein, the web-based file management system for collaboration is accessible via a wireless client.

3. The method of claim 1 further comprising:
restricting the one or more actions that may be performed on the shared file based on permission information.

4. The method of claim 1, further comprising:
presenting an option to enable posting or transmitting the shared file to another web-based media.

5. The method of claim 1, further comprising:
presenting information regarding one or more actions previously performed on the shared file.

6. The method of claim 5 wherein the information includes one or more from the group consisting of: a version history of the shared file, a use history of the shared file, a history of collaborators granted access to the shared file, permissions information history of the shared file, and a collaborator user access level history of the shared file.

7. The method of claim 1, wherein, the one or more actions include one or more from the group consisting of: create a new shared file, overwrite the shared file, organize the shared file into a folder, re-name the shared file, move the shared file, edit the shared file, display the shared file, delete the shared file, add a collaborator user to the shared file, remove a collaborator user from the shared file, change a permission information for the shared file, and change a collaborator user access level for the shared file.

8. A method for providing a file management service for collaboration, comprising:
providing access to a shared file hosted by the file management service;
wherein, access enables collaboration on the shared file by a plurality of collaborator users via the file management service;
wherein, collaboration includes enabling one or more actions to be performed on the shared file;
receiving selections of the one or more actions to be performed on the shared file;
controlling the one or more actions to be performed on the shared file based on set permissions;
wherein, the selected actions include a set of commands configured to cause a third-party application to perform the selected one or more actions on the shared file;
providing the third-party application with access to the shared file along with the set of commands to perform the selected one or more actions on the shared file;
wherein, the file management service enables integration with the third-party application via a configuration interface;
presenting options via the configuration interface to set values for one or more pre-defined parameters, the configuration interface accessible to a developer of the third-party web based application;
receiving, via the configuration interface, input values for the one or more predefined parameters; and
in response to receiving the selected one or more actions, generating the set of commands configured to cause the third-party application to perform the selected one or more actions on the shared file based on the received input values for the one or more predefined parameters.

9. The method of claim 8, wherein, the client is provided through a wireless device.

10. The method of claim 8, further comprising:
presenting information regarding one or more actions previously performed on the shared file.

11. The method of claim 10, wherein, the information includes one or more from the group consisting of: a version history of the shared file, a use history of the shared file, a history of collaborators granted access to the shared file, permissions setting history of the shared file, and a collaborator user access level history of the shared file.

12. The method of claim 8, wherein, the one or more actions include one or more from the group consisting of: create a new shared file, overwrite the shared file, organize the shared file into a folder, re-name the shared file, move the shared file, edit the shared file, display the shared file, delete the shared file, add a collaborator user to the shared file, remove a collaborator user from the shared file, change a permission setting for the shared file, and change a collaborator user access level for the shared file.

13. A computer-readable medium including instructions stored thereon, which when executed by a processor of a computer system, cause the computer system to:
present options to perform one or more actions on a shared file stored on a web-based file management system for collaboration;
receive a selection of the one or more actions to be performed on the shared file;

wherein, the selected one or more actions include a set of commands configured to cause a third-party web-based application to perform the selected one or more actions on the shared file; and provide the third-party web-based application with access to the shared file along with the set of commands to perform the selected one or more actions on the shared file;

wherein, the web-based file management system for collaboration enables integration with the third-party web-based application via a configuration interface;

present options via the configuration interface to set values for one or more pre-defined parameters, the configuration interface accessible to a developer of the third-party web based application;

receive, via the configuration interface, input values for the one or more predefined parameters; and in response to receiving the selected one or more actions, generate the set of commands configured to cause the third-party web-based application to perform the selected one or more actions on the shared file based on the received input values for the one or more predefined parameters.

14. The computer-readable medium of claim 13 further comprising instructions stored thereon, which when executed by the processor, cause the computer system to further:

present options to enable posting or transmitting the shared file to another web-based media.

15. The computer-readable medium of claim 13 further comprising instructions stored thereon, which when executed by the processor, cause the computer system to further:

present information regarding one or more actions previously performed on the shared file.

16. The computer-readable medium of claim 15, wherein the information includes one or more from the group consisting of: a version history of the shared file, a use history of the shared file, a history of collaborators granted access to the shared file, permissions information history of the shared file, and a collaborator user access level history of the shared file.

17. The computer-readable medium of claim 13, wherein, the one or more actions include one or more from the group consisting of: create a new shared file, overwrite the shared file, organize the shared file into a folder, re-name the shared file, move the shared file, edit the file, display the shared file, delete the shared file, add a collaborator user to the shared file, remove a collaborator user from the shared file, change a permission information for the shared file, and change a collaborator user access level for the shared file.

18. A method comprising:

presenting, by a server computer operating as part of a web-based file management system for collaboration, a graphical configuration interface that enables integration with a third-party web-based application, the graphical configuration interface accessible to a developer of the third-party web-based application, the graphical configuration interface including options to set values for one or more pre-defined parameters that define a service of the third-party web-based application, the service including an action that the third-party web-based application can take on a shared file stored in the web-based file management system;

receiving, by the server computer, via the graphical configuration interface, input values for the one or more predefined parameters;

in response to receiving the input values, generating and storing, by the server computer, a set of commands configured to cause the third-party web-based application to perform the action on the shared file;

presenting, by the server computer, a graphical user interface that includes options to perform one or more actions on the shared file stored on the web-based file management system for collaboration, the graphical user interface accessible to collaborator users of the shared file;

receiving, by the server computer, via the graphical user interface, a selection of the action to be performed on the shared file;

in response to receiving the selection of the action, automatically transmitting, by the server computer, via a computer network, a copy of the shared file along with the set of commands to perform the selected action on the copy of the shared file, to the third-party web-based application; and receiving, by the server computer, via the computer network, from the third-party web-based application, an updated copy of the shared file, once the third-party web-based application has performed the action.

* * * * *